United States Patent [19]
Matoba et al.

[11] Patent Number: 5,450,129
[45] Date of Patent: Sep. 12, 1995

[54] IMAGE PROCESSING APPARATUS FOR CONVERTING DIFFERENT TELEVISION STANDARD SIGNALS

[75] Inventors: Kazuyuki Matoba, Yokohama; Akira Suga, Tokyo; Akihiko Shiraishi, Kawasaki, all of Japan

[73] Assignee: Canon Kabushiki Kaisha, Tokyo, Japan

[21] Appl. No.: 185,227

[22] Filed: Jan. 24, 1994

Related U.S. Application Data

[63] Continuation of Ser. No. 732,576, Jul. 18, 1991, abandoned.

[30] Foreign Application Priority Data

| Jul. 19, 1990 | [JP] | Japan | 2-191604 |
| Jul. 19, 1990 | [JP] | Japan | 2-191605 |
| Jul. 25, 1990 | [JP] | Japan | 2-195056 |
| Nov. 2, 1990  | [JP] | Japan | 2-295199 |

[51] Int. Cl.⁶ .................. H04N 5/335; H04N 7/01
[52] U.S. Cl. .................. 348/294; 348/312; 348/445
[58] Field of Search .......... 348/581, 445, 294, 231, 348/312, 454, 457, 458; H04N 7/01, 5/335

[56] References Cited

U.S. PATENT DOCUMENTS

| 4,051,531 | 9/1977  | Baldwin .............. 358/140    |
| 4,163,249 | 7/1979  | Michael et al. ...... 358/21 R   |
| 4,426,664 | 1/1984  | Nagumo et al. ...... 358/213.26  |
| 4,633,293 | 12/1986 | Powers .............. 358/11     |
| 4,734,772 | 3/1988  | Akiyama ............. 358/213.13 |
| 4,760,455 | 7/1988  | Nagashima .......... 358/242     |
| 4,858,020 | 8/1989  | Homma .............. 358/213.13  |
| 4,887,153 | 12/1989 | Uehara et al. ....... 358/90     |
| 4,891,695 | 1/1990  | Uchikubo et al. .... 358/98      |
| 4,984,078 | 1/1991  | Skinner et al. ...... 348/581    |
| 5,036,397 | 7/1991  | Nagabusa ............ 358/213.26 |

FOREIGN PATENT DOCUMENTS

| 0372514  | 6/1990 | European Pat. Off. |
| 56-32881 | 4/1981 | Japan .             |
| 59-45771 | 3/1984 | Japan .             |
| 63-102580| 5/1988 | Japan .             |
| 2156496  | 6/1990 | Japan .             |

OTHER PUBLICATIONS

Jaroslav Hynecek, "A New Device Architecture Suitable for High-Resolution and High-Performance Image Sensors," IEEE Transactions on Electron Devices, vol. 35, No. 5, pp. 646–652 (May 1988).

Better Video Images, 23rd Annual SMPTE Television Conference in San Francisco, Feb. 3–4, 1989, pp. 200–216, N. W. Green et al., "Engineering and Program Production Experience with High-Definition."

SMPTE Journal, vol. 99, No. 6, Jun. 1990, pp. 438–441, Stanley S. Baron et al., "Common Image Format for International Television Program Exchange."

*Primary Examiner*—Wendy R. Greening
*Attorney, Agent, or Firm*—Fitzpatrick, Cella, Harper & Scinto

[57] ABSTRACT

An image processing apparatus for converting different television standard signals includes an image pickup apparatus for selectively outputting an image signal of one of (i) a first television scheme and (ii) a second television scheme having a larger number of pixels than the first television scheme. An image pickup device is provided having a number of pixels corresponding to the first television scheme. A memory is provided for storing an output image signal from the image pickup device at a frequency corresponding to the first television scheme. An interpolation signal generating circuit is provided for generating an interpolation signal by adding a constant signal to a television signal corresponding to the second television scheme for compensating for an output of the second television signal. Video signal forming circuitry is also provided for forming a video signal by combining the signal read out from the memory and the interpolation signal generated by the interpolation signal generating circuitry.

5 Claims, 29 Drawing Sheets

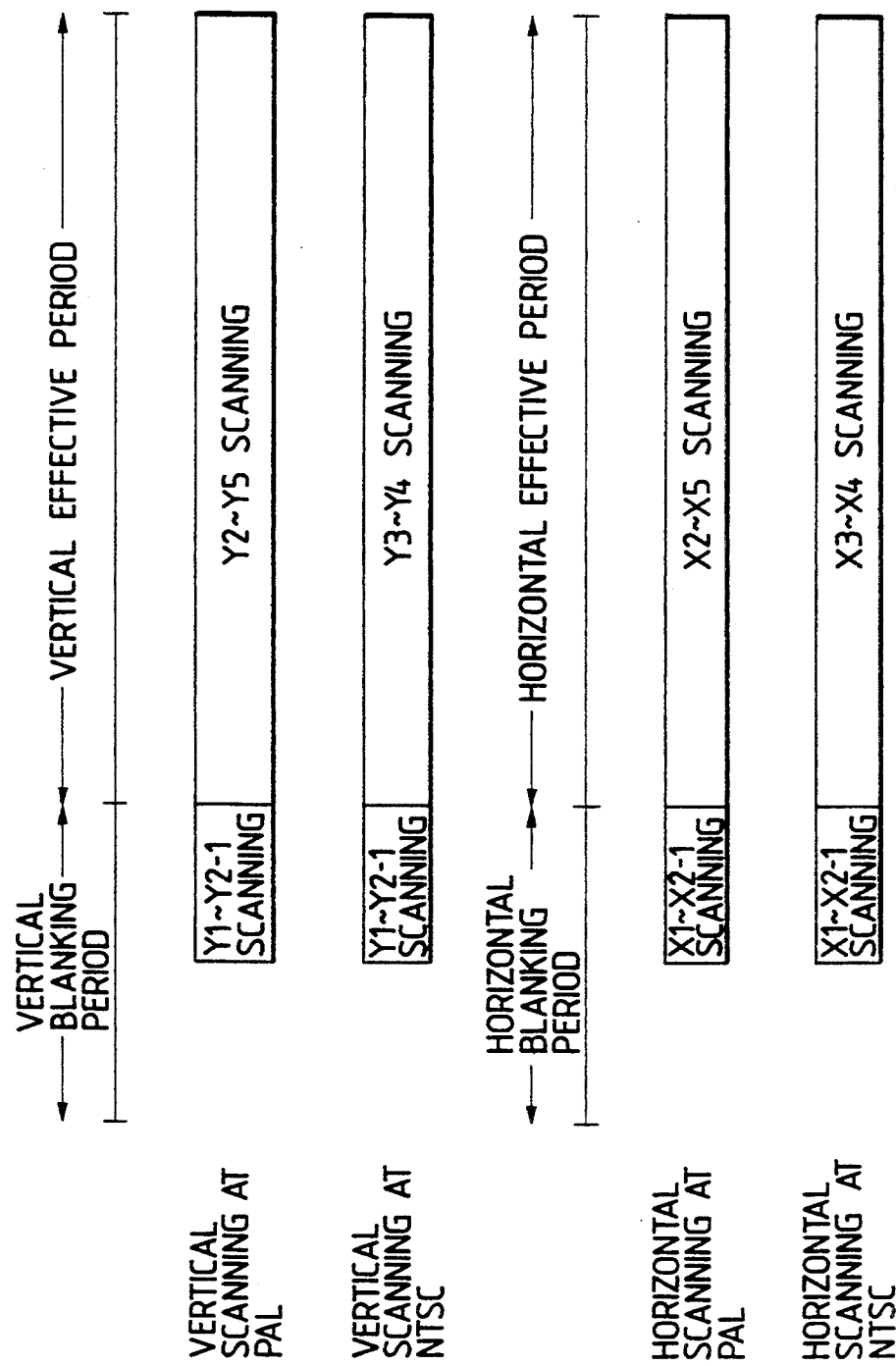

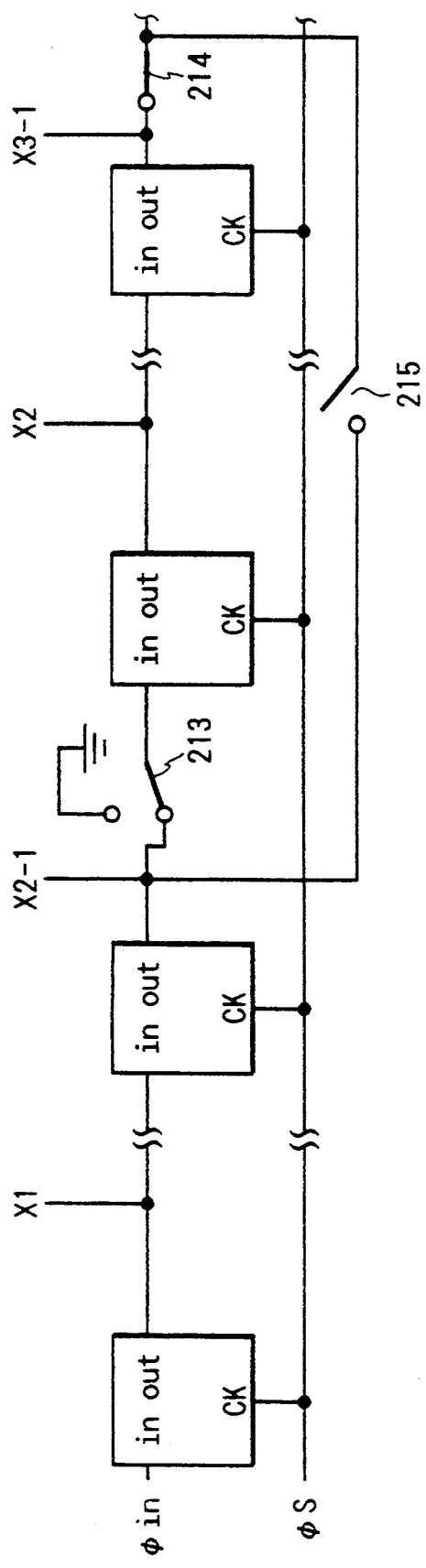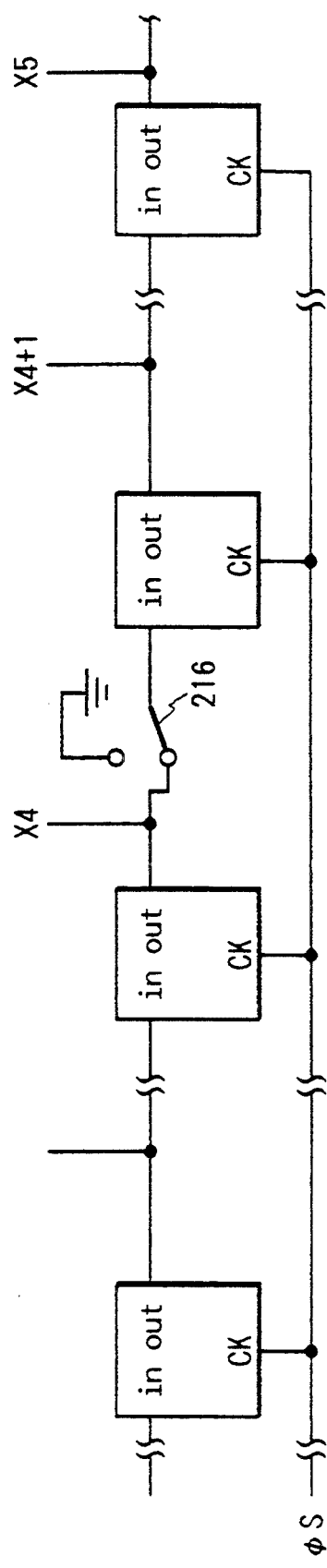

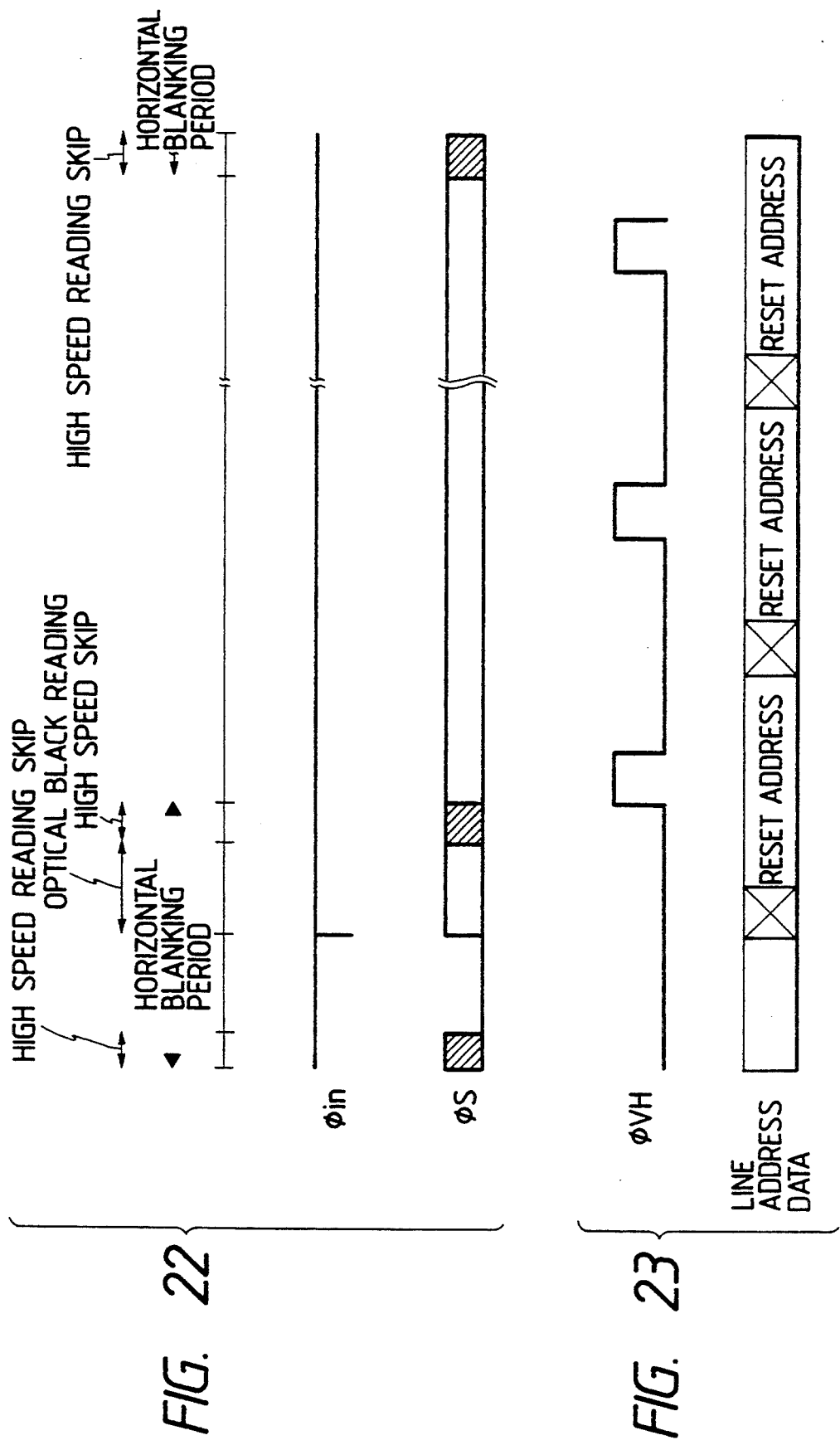

REDUCTION MODE

INTERPOLATION MODE

IMAGE PROCESSING APPARATUS FOR CONVERTING DIFFERENT TELEVISION STANDARD SIGNALS This application is a continuation of application Ser. No. 07/732,576 filed Jul. 18, 1991, now abandoned.

BACKGROUND OF THE INVENTION

1. Field of the Invention

The present invention relates to an image processing apparatus capable of converting different television schemes.

2. Related Background Art

Television schemes include an NTSC scheme, a PAL scheme, and a SECAM scheme. These schemes have different image synchronizing signal standards. For example, the PAL standard has 625 scanning lines and a horizontal scanning period of 64 µs, while the NTSC standard has 525 scanning lines and a horizontal scanning period of 63.5 µs. Video equipment such as a video movie camera, an electronic still camera, a video recording/regeneration apparatus are manufactured to comply with one of the television schemes due to differences between the television schemes. One image pickup apparatus cannot obtain video signal outputs of different television schemes.

When an image picked up by a video camera sold in Japan is to be regenerated in Europe, an NTSC image regeneration apparatus and an NTSC television set must be prepared. When an image picked up and recorded by the PAL scheme in Europe is to be regenerated in Japan, a PAL image regeneration apparatus and a PAL television set must be prepared.

Since the PAL and NTSC cameras have different numbers of scanning lines, PAL and NTSC solid state image pickup elements having different numbers of vertical pixels are used to arrange the corresponding image pickup apparatuses.

In a conventional image pickup apparatus described above, however, NTSC and PAL solid state image pickup elements must be separately manufactured due to a difference in the number of scanning lines, resulting in increases in development cost and fabrication cost.

Various proposals about television scheme conversion methods have been made by the present assignee, but there is much room left for various improvements.

SUMMARY OF THE INVENTION

It is an object of the present invention to provide an image processing apparatus capable of solving all or individual conventional problems described above.

It is another object of the present invention to provide an image processing apparatus capable of obtaining outputs of a plurality of television schemes.

It is still another object of the present invention to provide an image recording/regeneration apparatus compatible with plural types of television signals.

It is still another object of the present invention to provide an image pickup apparatus for obtaining outputs of a plurality of television schemes.

In order to achieve the above objects according to an aspect of the present invention, there is provided an image processing apparatus comprising:

a) an image pickup element having a number of scanning lines larger than that of a second standard television signal having a number of scanning lines different from that of a first standard television signal; and b) means for generating an image signal having the number of scanning lines of the first standard television signal by using the image pickup element.

It is still another object of the present invention to provide an image pickup apparatus compatible with television schemes having different scanning ranges by using one solid state image pickup element.

In order to achieve the above object according to another aspect of the present invention, there is disclosed an apparatus used for a plurality of television schemes having different scanning ranges, comprising an image pickup element having the numbers of pixels in horizontal and vertical directions corresponding to one of the television schemes which has a maximum scanning range, and switching means for switching between the plurality of television schemes, wherein when a television scheme having a narrow scanning range is selected, unnecessary pixels of the image pickup element are skipped for reading to cope with the television schemes having the different scanning ranges.

The above and other objects, features, and advantages of the present invention will be apparent from the detailed description of the preferred embodiments in conjunction with the accompanying drawings.

BRIEF DESCRIPTION OF THE DRAWINGS

FIG. 17 is a view for explaining read access of the solid state image pickup element in the PAL and NTSC modes;

FIGS. 18A and 18B are diagrams showing set states of switches in the PAL mode;

FIG. 22 is a view showing a drive method of a horizontal shift register for performing reading skip of a horizontal unnecessary portion without using the switches shown in FIGS. 18A and 18B;

FIG. 23 is a view showing a drive method of quickly clearing a light-receiving portion not subjected to read access in the NTSC vertical scanning;

DETAILED DESCRIPTION OF THE PREFERRED EMBODIMENTS

Figure 1:
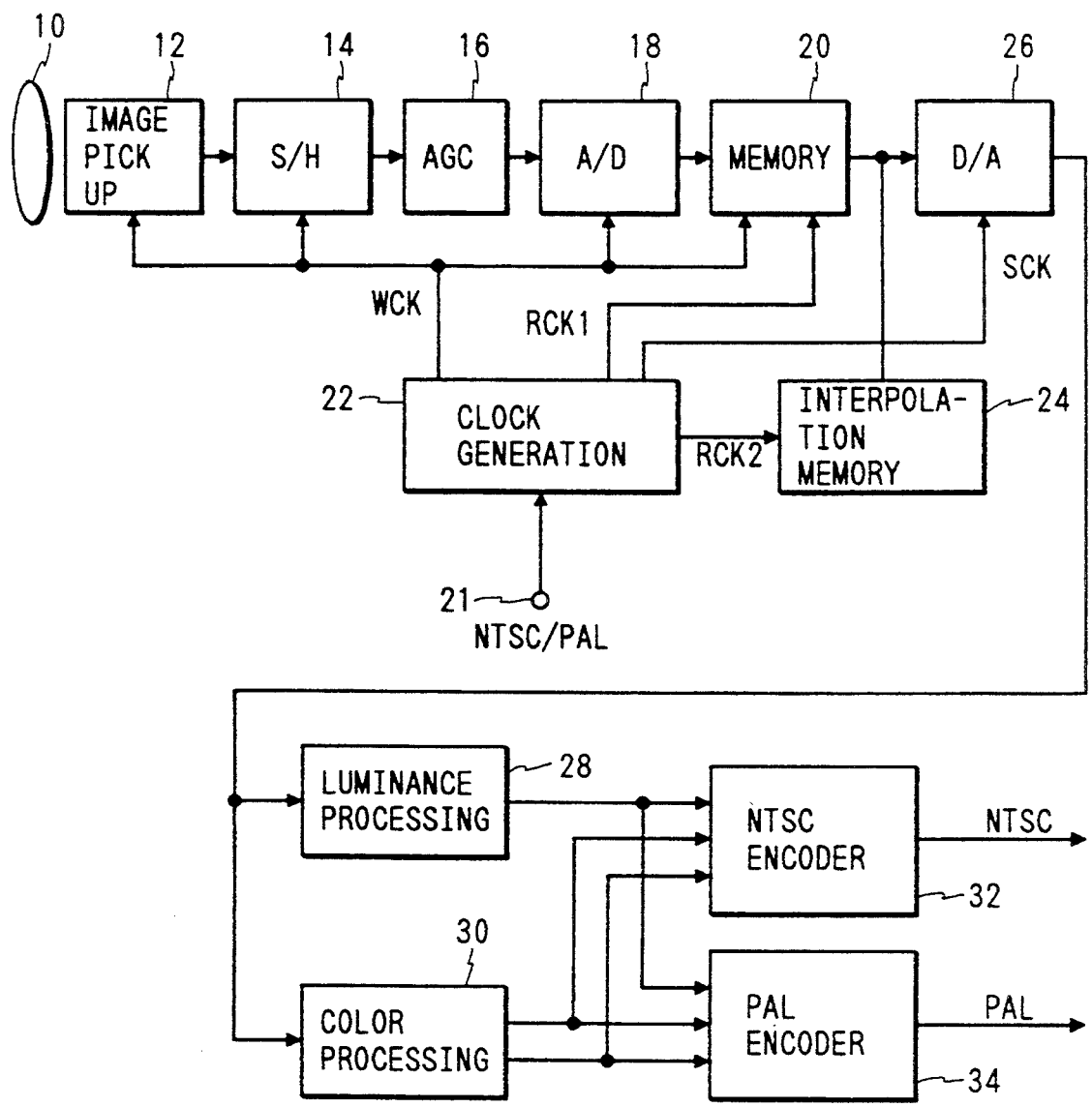
FIG. 1 is a block diagram showing an arrangement according to an embodiment of the present invention.

FIG. 1 is a block diagram showing an arrangement of a video camera according to an embodiment of the present invention. The video camera includes a photographic lens 10, a solid state image pickup element 12, a sample/hold (S/H) circuit 14, an automatic gain control (AGC) circuit 16, an A/D converter 18, a memory 20, an input terminal 21, a clock generation circuit 22, an interpolation memory 24, a luminance processing circuit 28, a color processing circuit 30, an NTSC encoder 32, and a PAL encoder 34. The input terminal 21 receives an NTSC/PAL mode signal for designating an output television scheme (NTSC or PAL mode). The input terminal 21 may receive a manually selected signal. The interpolation memory 24 stores interpolation data (to be described later). The NTSC encoder 32 forms and outputs an NTSC composite video signal from outputs from the luminance processing circuit 28 and the color processing circuit 30. The PAL encoder 34 forms and outputs a PAL composite video signal from outputs from the luminance processing circuit 28 and the color processing circuit 30.

This embodiment aims at converting a television scheme having a small number of pixels into a television scheme having a large number of pixels. A lack of information is compensated by assigning prepared interpolation data to, e.g., the upper, lower, right, and left ends of the frame. Images represented by the interpolation data appear at the upper, lower, right, and left ends of the regenerated image of the converted television scheme. In this case, desired colors and patterns can be selected in accordance with proper selection of the interpolation data. For example, assume that the NTSC television scheme is to be converted into the PAL television scheme. In this case, since the quantities of PAL horizontal and vertical pieces of information are larger than those of NTSC horizontal and vertical pieces of information and if upper, lower, right, and left end image portions can be assumed to be omitted, the lack of image information can be interpolated by black, gray, white, or any other color or pattern at the end frame portions. The interpolation data is prestored in the interpolation memory 24.

The basic operation of the arrangement shown in FIG. 1 will be described below. An optical image from the photographic lens 10 is converted into an electrical signal by the image pickup element 12. An output from the image pickup element 12 is sampled and held by the S/H circuit 14, and an output from the S/H circuit 14 is automatically controlled by the AGC circuit 16 to have an appropriate gain. An output from the AGC circuit 16 is input to the A/D converter 18. The A/D converter 18 converts the output signal from the AGC circuit 16 into a digital signal in response to a clock WCK from the clock generation circuit 22. The digital signal is then written in the memory 20. This clock WCK is simultaneously supplied to the image pickup element 12, the S/H circuit 14, the A/D converter 18, and the memory 20. The clock WCK has a frequency complying with the NTSC scheme. Write operations from the image pickup element 12 to the memory 20 comply with the NTSC scheme.

The clock generation circuit 22 (to be described in detail later) supplies a read clock RCK to the read clock input of the memory 20. The read clock RCK1 has a frequency and a timing corresponding to the television scheme designated by an NTSC/PAL mode signal input to the input terminal 21. The clock generation circuit 22 supplies a read clock RCK2 to the interpolation memory 24, as needed. The clock generation circuit 22 supplies a sampling clock SCK to a D/A converter 26. The sampling clock SCK has a frequency corresponding to the television scheme designated by the NTSC/PAL mode signal. Data read out from the memory 20 and the interpolation memory 24 in response to the clocks RCK1 and RCK2 are converted into analog signals by the D/A converter 26. The output from the D/A converter is subjected to luminance processing and color processing by the luminance and color processing circuits 28 and 30. The outputs from the luminance and color processing circuits 28 and 30 are converted into an NTSC composite video signal by the NTSC encoder 32 and a PAL composite video signal by the PAL encoder 34.

Although not shown, a switch for switching between the encoders 32 and 34 in accordance with the NTSC/PAL mode signal input to the input terminal 21 may be arranged. Alternatively, one of the encoders 32 and 34 may be started.

Features of processing of each television scheme will be briefly described below. In general, the sampling frequency of the image pickup element must be set as an integer multiple of a frequency fsc of a color subcarrier so as to minimize beat interference between the sampling clock and the color video signal. When sample points on a given frame in the vertical and horizontal directions have identical positions of those on an immediately preceding or succeeding frame of the given frame in the same directions, image processing can be facilitated. For this reason, the sampling frequency is often set to be an even-number multiple of fsc. For example, if the sampling frequency is defined as 4 fsc, the sampling frequency of the PAL scheme employed in Europe becomes 4 fpsc=17.73 MHz since a color subcarrier frequency fpsc is 4.43 MHz. On the other hand, the sampling frequency of the NTSC scheme employed in Japan and the United States becomes 4 fnsc=14.32 MHz because a color subcarrier frequency fnsc is 3.58 MHz. Therefore, the numbers of horizontal pixels in the PAL and NTSC schemes are 1,135 (=4 fpsc×64 μs) and 910 (=4 fnsc×63.5 μs), respectively. The numbers of horizontal scanning lines are 625 (PAL) and 525 (NTSC), respectively.

Figure 3:
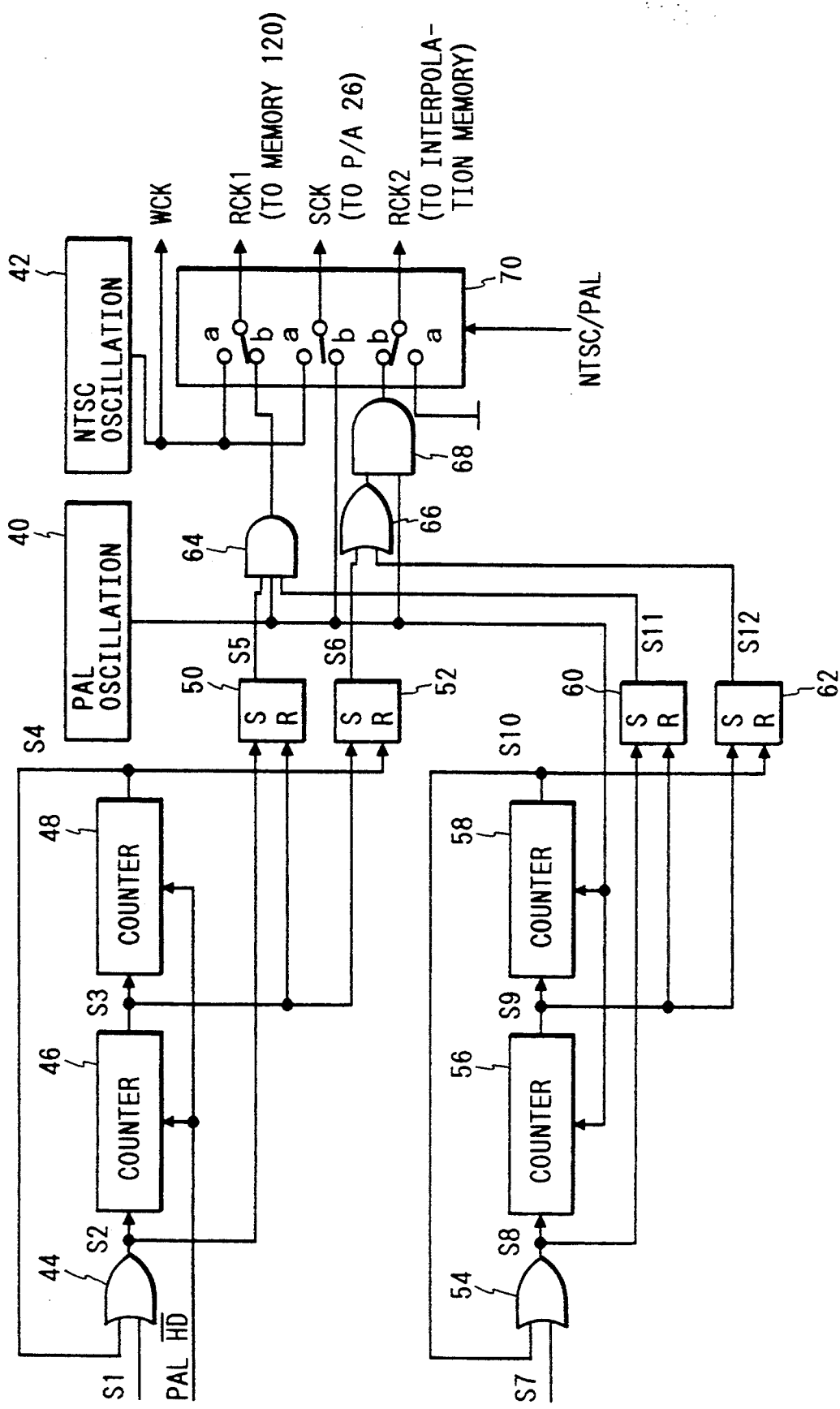
FIG. 3 is a block diagram showing an arrangement of a clock generation circuit 22 in FIG. 1.

FIG. 3 is a block diagram showing the clock generation circuit 22. The clock generation circuit 22 includes an oscillator 40 for generating a PAL clock and an oscillator 42 for generating an NTSC clock.

The clock generator 22 also includes an OR gate 44, a counter 46, a counter 48, and flip-flops 50 and 52. The counter 46 starts counting PAL horizontal synchronizing pulses in response to an output pulse S2 from the OR gate 44 and outputs a signal S3 when a count reaches a horizontal scanning line count of an NTSC field, i.e., 525/2. The counter 48 starts counting PAL horizontal synchronizing pulses in response to the signal S3 from the counter 46 and outputs a signal S4 when a count reaches a value (i.e., 100/2) obtained by subtracting the horizontal scanning line count of the NTSC field from a horizontal scanning line count of a PAL field (625/2). The output S4 from the counter 48 is input to one input terminal of the OR gate 44. The other input terminal of the OR gate 44 receives a start pulse S1 formed from the first NTSC vertical synchronizing signal detected immediately after scheme conversion (not shown) is started. The OR gate 44, the counters 46 and 48, and the RS flip-flops 50 and 52 form a mask signal for masking an output clock from the PAL oscillator 40 in the vertical direction.

The clock generation circuit 22 further includes an OR gate 54, a counter 56, a counter 58, and RS flip-flops 60 and 62. The counter 56 starts counting the output clocks from the PAL clock oscillator 40 in response to an output pulse S8 from the OR gate 54 and outputs a signal S9 when a count reaches a clock count (i.e., 910) corresponding to the one NTSC horizontal scanning period of 63.5 μs. The counter 58 starts counting the output clocks from the PAL clock oscillator 40 in response to the output pulses S9 from the counter 56 and outputs a signal S10 when a count reaches a clock count (i.e., 225) corresponding to the remaining PAL horizontal scanning period of 12.6 μs (=64−51.4). The output from the counter 58 is input to one input terminal of the OR gate 54. The other input terminal of the OR gate 54 receives a start pulse S7 formed from the first NTSC horizontal synchronizing signal detected immediately after the scheme conversion (not shown) is started. The OR gate 54, the counters 56 and 58, and the RF flip-flops 60 and 62 form a mask signal for masking the output clock from the PAL oscillator 40 in the horizontal direction.

In addition to the above components, the clock generation circuit 22 includes an AND gate 64, an OR gate 66, an AND gate 68, and a switch 70 turned on/off in accordance with an NTSC/PAL mode signal.

First, an operation using the NTSC scheme as an output scheme will be described below. The image pickup element 12 is driven at the NTSC sampling frequency 4 fnsc=14.43 MHz. An output from the image pickup element 12 is converted into a digital signal in accordance with the 4fnsc sampling clocks. The digital signal is then written in the memory 20. When the digital signal is read in accordance with the NTSC scheme, the switch 70 is set at the position of the contact a in accordance with the NTSC/PAL signal. The frequency of each of the read clock RCK1 of the memory 20 and the sampling clock SCK of the D/A converter 26 is given as 4 fnsc. Since interpolation using interpolation data stored in the interpolation memory 24 need not be performed, the read clock RCK2 for the interpolation memory 24 is fixed to low (or high) level. The data stored in the memory 20 is directly converted into an analog signal by the D/A converter 26. The analog signal is processed by the luminance processing circuit 28 and the color processing circuit 30. Outputs from these processing circuits 28 and 30 are converted into a composite video signal by the NTSC encoder 32.

Figure 4:
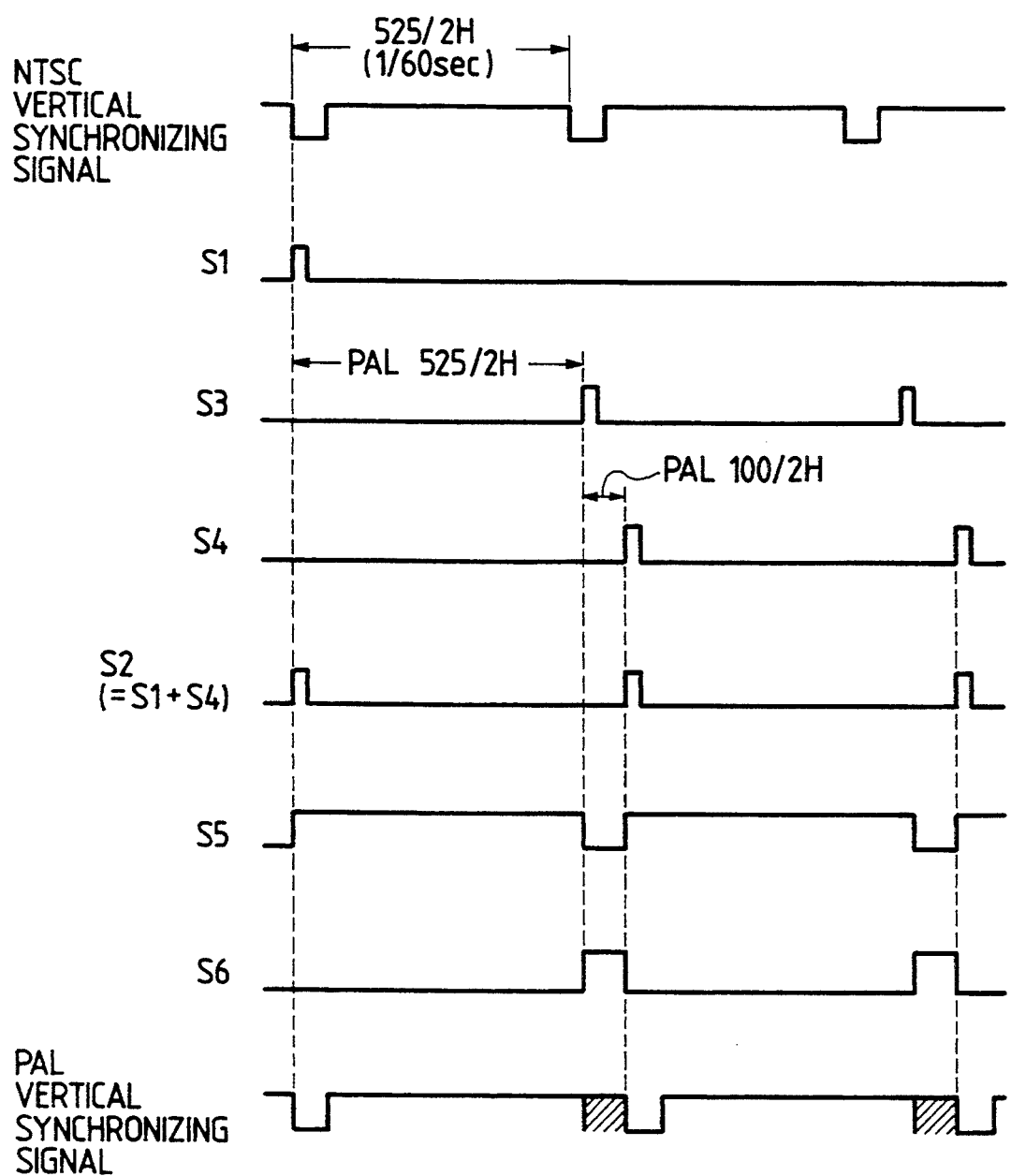
FIG. 4 is a timing chart in vertical scanning when the NTSC scheme is converted into the PAL scheme.
Figure 5:
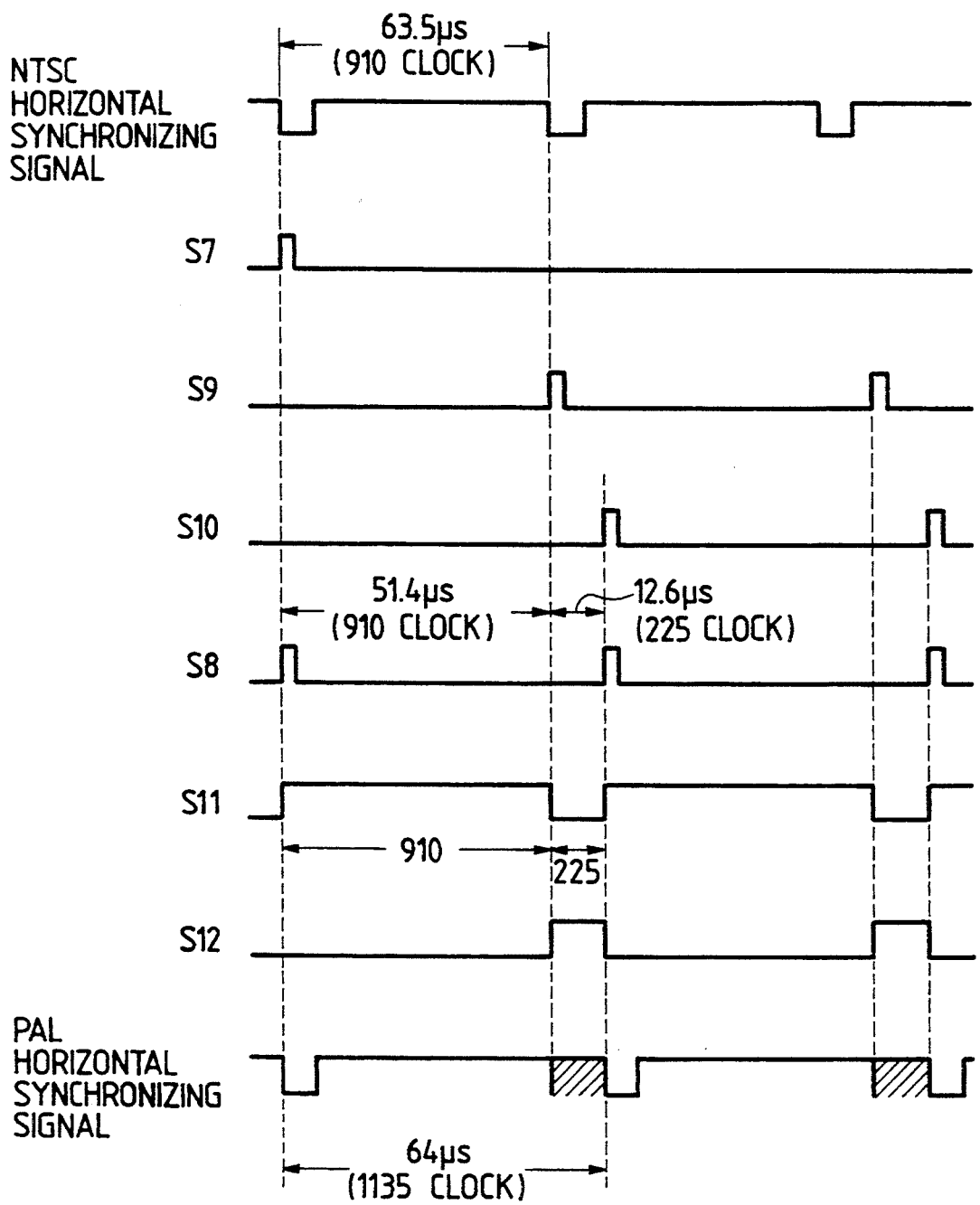
FIG. 5 is a timing chart in horizontal scanning when the NTSC scheme is converted into the PAL scheme.

An operation using the PAL scheme as an output scheme will be described below. FIG. 4 is a timing chart showing vertical scanning, and FIG. 5 is a timing chart showing horizontal scanning. Signals S1 to S10 in FIGS. 4 and 5 correspond to the signals S1 to S10 in FIG. 3, respectively.

Vertical scanning will be described below. When the start pulse S1 is input to the counter 46 through the OR gate 44, the counter 46 counts PAL horizontal synchronizing signals by an NTSC horizontal scanning line count of 525/2 of the PAL field horizontal scanning line count (i.e., 625/2) and outputs the signal S3. The counter 48 starts counting in response to the signal S3 and outputs the signal S4 when it counts 100/2 (=625/2−525/2) pulses. The signal S4 is input to the counter 46 through the OR gate 44. Therefore, the OR gate 44 applies the pulse S2 to the counter 46 every PAL vertical synchronizing period.

The RS flip-flop 50 is set in response to the signal S2 and is reset in response to the signal S3. The RS flip-flop 52 is set in response to the signal S3 and is reset in response to the signal S4. In this manner, the mask signal S5 for masking the output clocks from the PAL oscillator 42 is obtained from the RS flip-flop 50 so as to read only data from the memory 20. The RS flip-flop 52 outputs the mask signal S6 for masking the output clocks from the PAL oscillator 42 so as to read only the interpolation data from the interpolation memory 24. As is apparent from FIG. 4, the mask signals S5 and S6 have waveforms which compensate for mask portions of the signals S6 and S5. During a period of 525/2 H upon reception of the first vertical synchronizing signal, the NTSC data written in the memory 20 is read out. During the remaining period of 100/2 H, the interpolation data written in the interpolation memory 24 is read out to obtain one-field PAL data.

An operation of horizontal scanning will be described with reference to FIG. 5. Upon start of scheme conversion, the pulse signal S7 generated in synchronism with detection of the first horizontal synchronizing signal triggers the counter 56 through the OR gate 54, the counter 56 counts output clocks from the PAL oscillator 40 by a 51.4-μs period (i.e., clock count of 910 corresponding to one NTSC horizontal scanning period of 63.5 μs) of one PAL horizontal scanning period of 64 μs and outputs the pulse signal S9. The counter 58 is started in response to the signal S9. When the counter 58 counts output clocks from the PAL oscillator 40 by a period of 12.6 μs (=64−51.4; clock count: 225), it outputs the pulse signal S10. The signal S10 is supplied as the signal S8 to the counter 56 through the OR gate 54. The output signal S8 from the OR gate 54 serves as a 64-μs period pulse signal from the first NTSC horizontal scanning signal immediately after scheme conversion is started.

The RS flip-flop 60 is set in response to the signal S8 and is reset in response to the signal S9. The RS flip-flop 62 is set in response to the signal S9 and is reset in response to the signal S10. The RS flip-flop 60 outputs a mask signal S11 for masking output clocks from the PAL oscillator 42 so as to read out only the data from the memory 20. The RS flip-flop 62 outputs a mask signal S12 for masking output clocks from the PAL oscillator 42 so as to read out only the interpolation data from the interpolation memory 24. As is apparent from FIG. 5, the mask signals S11 and S12 have waveforms for compensating for mask portions of the mask signals S12 and S11. During a 63.5-μs period upon reception of the first horizontal synchronizing signal, the NTSC data is read out from the memory 20. During the remaining period of 0.5 μs, the interpolation data is read out from the interpolation memory 24, thereby obtaining one PAL horizontal scanning period.

Figure 2:
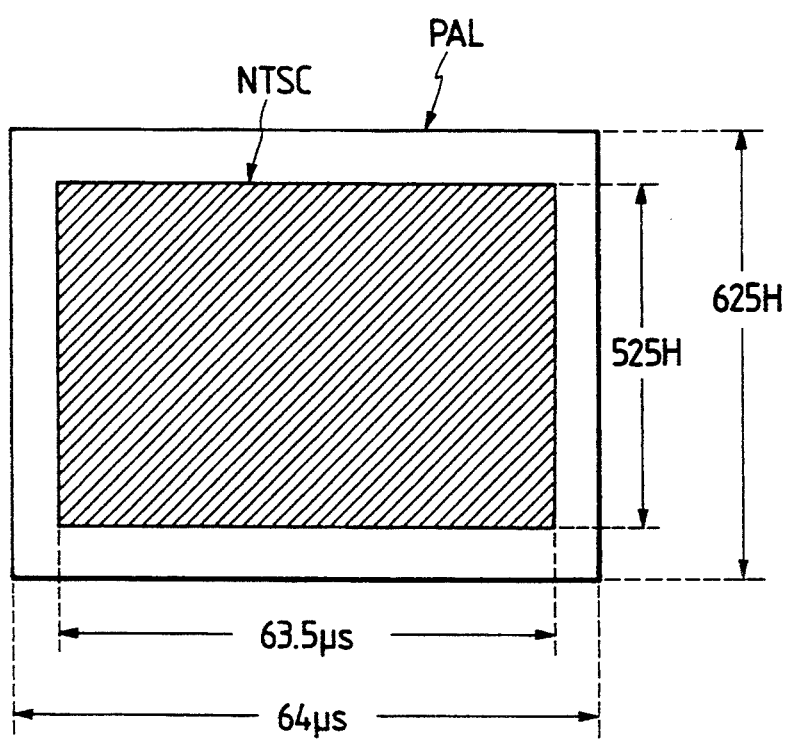
FIG. 2 is a view showing NTSC and PAL frame sizes.

The AND gate 64 forms the clock RCK1 for causing read access of the memory 20 during a hatched region of FIG. 2 and not causing such read access during a region other than the hatched region in accordance with the mask signals S5 and S11 obtained as described above and the output clock from the PAL oscillator 42. A circuit constituted by the OR and AND gates 66 and 68 generates a clock RCK2 in accordance with an AND signal from the output clock of the PAL oscillator 42 and an AND signal of the signals S6 and S11. The clock RCK2 accesses the interpolation memory 24 during the region except for the hatched region in FIG. 2 and does not access it during the hatched region. An output from the AND gate 64 is supplied as the read clock RCK1 to the memory 20 through the switch 70. An output from the AND gate 68 is supplied as the read clock RCK2 to the interpolation memory 24 through the switch 70.

Figure 6:
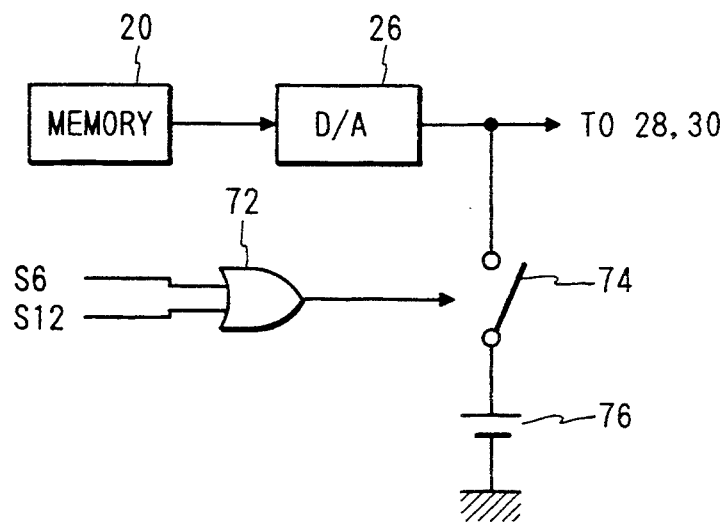
FIG. 6 is a block diagram showing a substitute of an interpolation memory 24.

In the above embodiment, the lack of pixels is compensated by the interpolation data stored in the interpolation memory 24. If the lack can be sufficiently compensated by DC components such as black, white, or gray components, a portion of the interpolation memory 24 in FIG. 1 can be simplified, as shown in FIG. 6. An arrangement in FIG. 6 includes an OR gate 72 for calculating an OR signal of the signals S6 and S12 in FIG. 3, a switch 74 turned on in response to an output from the OR gate 74, and a battery 76 turned on in response to an output from the OR gate 74. The OR gate 72 turns the switch 74 on during the pulse periods of the signal S6 in FIG. 4 and the signal S12 in FIG. 5. Therefore, a voltage output from the battery 74 is applied to the luminance processing circuit 28 and the color processing circuit 30 during a period corresponding to an image portion to be interpolated.

In the above embodiment, each of the NTSC and PAL sampling frequencies is set to be 4 fsc, i.e., four times the color subcarrier frequency fsc. However, the sampling frequency is not limited to this. For example, a frequency having a pixel aspect ratio of 1: 1 (12.29 MHz for NTSC; 14.74 MHz for PAL) or any other frequency may be employed. In the above embodiment, an NTSC image is always regenerated and displayed at the upper left corner of the frame, and images represented by interpolation data are displayed at the right and lower ends of the frame. However, when initial values of the counters 46, 48, 56, and 58 are changed to display storage images of the memory 20 at arbitrary positions on the frame.

Conversion from the NTSC scheme to the PAL scheme has been exemplified. However, conversion from the PAL scheme to the NTSC scheme may be similarly realized.

As can be easily understood from the above description, a simple arrangement according to the present invention can perform conversion of different television schemes.

In the above embodiment, the image pickup element 12 has the NTSC pixel count, and a PAL output is derived. However, in the following embodiment, an image pickup element 12' has a PAL pixel count, and an NTSC output signal can be derived.

Figure 7:
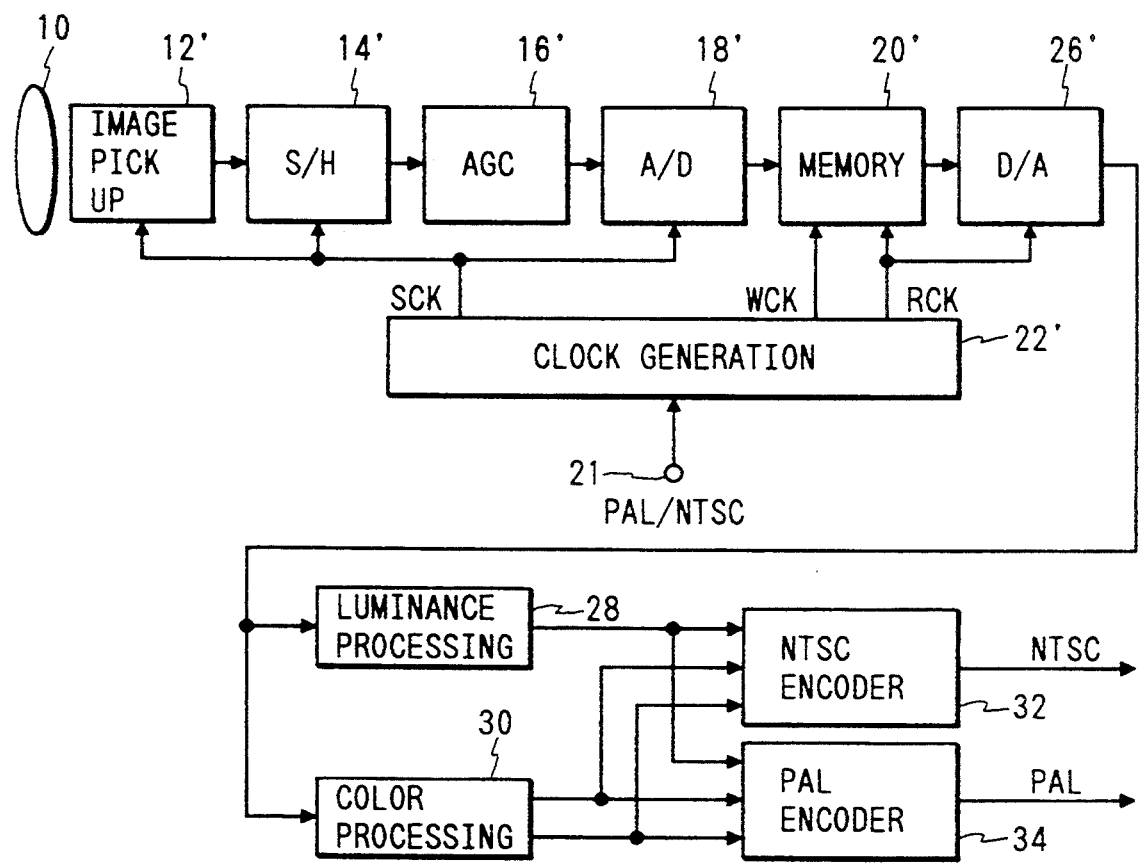
FIG. 7 is a block diagram showing an arrangement of another embodiment of the present invention.

An arrangement of this embodiment is shown in FIG. 7. The same reference numerals as in FIG. 1 denote the same parts in FIG. 7, and a detailed description thereof will be omitted. If each part having a function slightly different from the corresponding one in FIG. 1 is suffixed with a prime.

Figure 8:
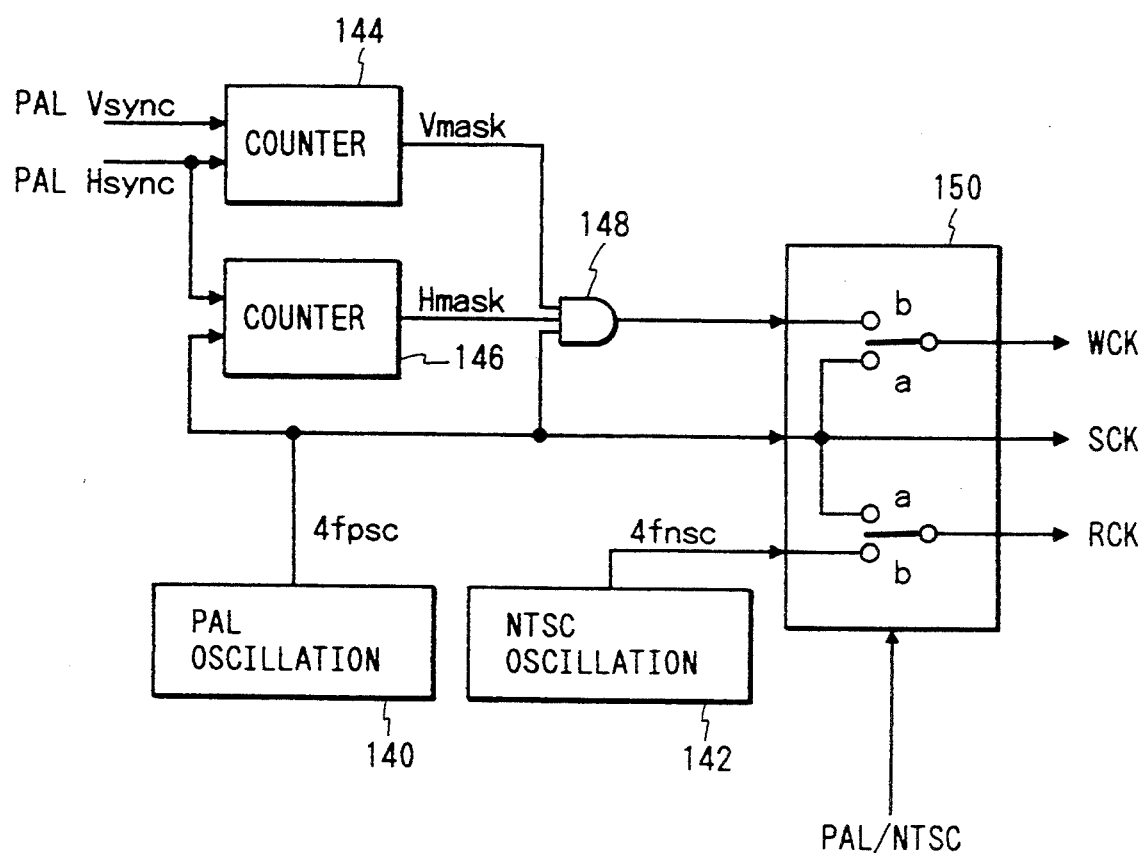
FIG. 8 is a block diagram showing an arrangement of a clock generation circuit 22' shown in FIG. 7.

FIG. 8 shows a detailed circuit arrangement of a clock generation circuit 22' shown in FIG. 7. The clock generation circuit 22' includes an oscillator 140, an oscillator 142, a counter 144, a counter 146, an AND gate 148, and a switch 150. The oscillator 140 generates a clock having a frequency four times the PAL subcarrier frequency fpsc. The oscillator 142 generates a clock having a frequency four times the NTSC color subcarrier frequency fnsc. The counter 144 generates a mask signal Vmask for masking output clocks from the oscillator 140 in the vertical direction in an NTSC output mode. The counter 146 generates a mask signal Hmask for masking the output signals from the oscillator 140 in the horizontal direction in the NTSC output mode. The switch 150 is switched in accordance with a PAL/NTSC mode signal. When the PAL/NTSC mode signal represents the PAL scheme, the switch 150 is set at a position of a contact a. However, when the PAL/NTSC mode signal represents the NTSC mode, the switch 150 is set at a position of a contact b. Referring to FIG. 8, a PAL horizontal synchronizing signal is represented by PAL Hsync, and a PAL vertical synchronizing signal is represented by a PAL Vsync.

An operation for obtaining a PAL output in the apparatus shown in FIG. 7, i.e., designating the PAL mode in accordance with the PAL/NTSC mode signal input to an input terminal 21 will be described below. The image pickup element 12' converts an optical image from a photographic lens 10 into an electrical signal. The electrical signal is read in response to a sampling clock SCK of a frequency 4 fpsc from the clock generation circuit 22'. An S/H circuit 14' samples and holds an output from the image pickup element 12'. An AGC circuit 16' automatically adjusts an output level of the S/H circuit 14' to an appropriate value. An A/D converter 18' converts an output signal from the AGC circuit 16' into a digital signal in accordance with the sampling clock SCK.

In the PAL mode, the switch 150 shown in FIG. 8 is set at a position of the contact a, and a read clock WCK generated by the clock generation circuit 22' is a clock of a frequency 4 fpsc output from the PAL oscillator 140. Output data from the A/D converter 18' is written in a memory 20' in response to this write clock WCK. A read clock RCK generated by the clock generation circuit 22' is a clock of the frequency 4 fpsc output from the PAL oscillator 140. Data stored in the memory 20 is read out in response to this read clock RCK, and the readout data is converted into an analog signal by a D/A converter 26'. That is, the output signal from the D/A converter 26' substantially coincides with the output signal from the AGC circuit 16'.

The output signal from the D/A converter 26' is subjected to luminance processing by a luminance processing circuit 28 and color processing by a color processing circuit 30. Outputs from these processing circuits 28 and 30 are converted into a PAL composite video signal by a PAL encoder 34.

Figure 9:
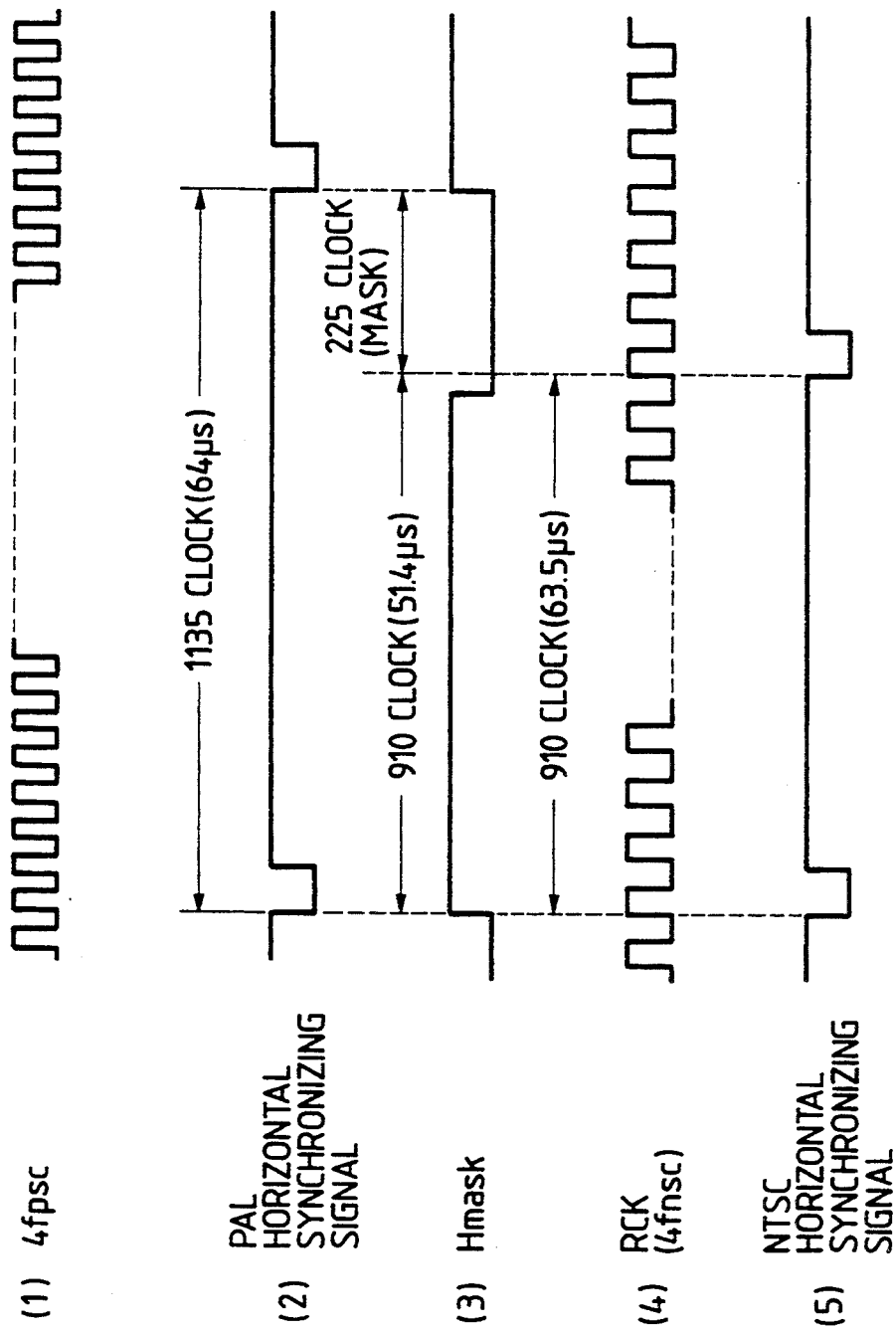
FIG. 9 is a timing chart in horizontal scanning in the NTSC mode.

An operation in the NTSC mode will be described with reference to FIGS. 9(1) to 9(5) and 10(1) to 10(4). FIGS. 9(1) to 9(5) are timing charts showing horizontal scanning, and FIGS. 10(1) to 10(4) are timing charts showing vertical scanning. Operations from the image pickup element 12' to the A/D converter 18' are the same as those in the PAL mode described above. Since the A/D converter 18 is operated in response to the PAL sampling clock, timings of the synchronizing signals are deviated from the appropriate timings. This deviation of the timing of the synchronizing signal can be corrected as follows. Write access of the memory 20' is performed for a period of 910 clocks (51.4 μs) at 4 fpsc, i.e., the period of clocks having the same number as the NTSC horizontal pixel count of 910 (63.5 μs) during the one PAL horizontal scanning period having 1,135 clocks. During the remaining 225-clock period (i.e., 12.6 μs at 4 fpsc), write access of the memory 20' is inhibited. An NTSC vertical synchronizing signal is generated every 625/2 H, and a PAL vertical synchronizing signal is generated every 525/2 H. For this reason, write access of the memory 20' is performed during a scanning period of 525/2 H of the PAL 625/2 H. Write access of the memory 20 H is inhibited during the remaining 100/2 H scanning period.

Figure 10:
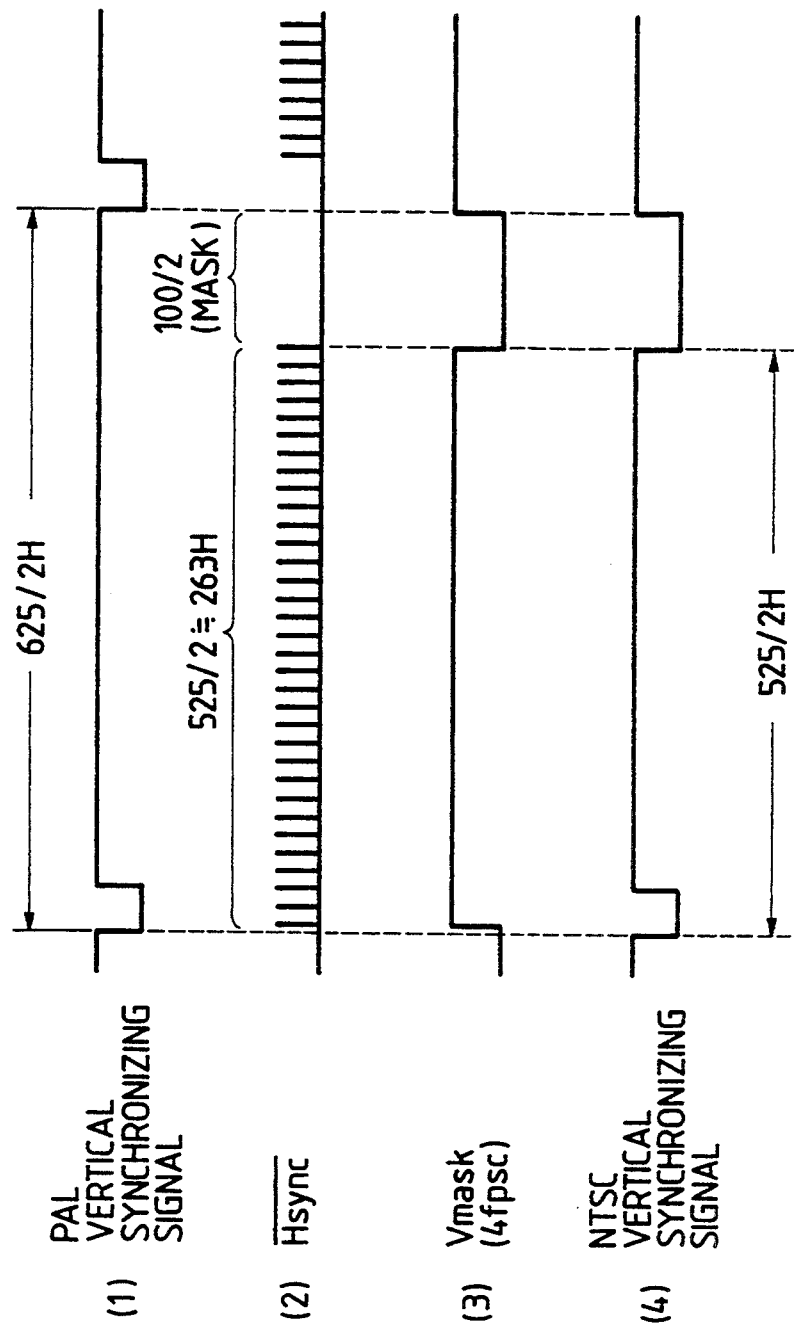
FIG. 10 is a timing chart in vertical scanning in the NTSC mode.

An operation in the NTSC mode will be briefly described below. The counter 144 starts counting the pulses of the PAL horizontal sync signal Hsync in synchronism with the PAL vertical synchronizing signal Vsync. When the counter 144 counts the number of one-field horizontal scanning lines (263), a Vmask signal (low) is output. The Vmask signal goes high in response to the next vertical synchronizing signal. After the counter value is reset, counting of pulses of the horizontal synchronizing signal Hsync is started. In this manner, as shown in FIG. 10(3), a vertical mask signal Vmask for masking a period of 100/2 H is obtained.

The counter 146 starts counting output clocks (frequency: 4 fpsc) from the PAL oscillator 140 in synchronism with the PAL horizontal synchronizing signal Hsync. When the counter 146 counts pixels (corresponding to 51.4 μs at the frequency 4 fpsc) having the same number as the NTSC horizontal pixel count (i.e., 910 at 4 fnsc), the counter 146 outputs an Hmask signal (low). The Hmask signal goes high in response to the next horizontal synchronizing signal. After the counter value is reset, the counter 146 starts counting pulses of the horizontal synchronizing signal Hsync. In this manner, as shown in FIG. 9(3), a horizontal mask signal Hmask for masking 225 (=1135−910) clocks can be obtained.

The mask signals Vmask and Hmask, and the output clocks from the PAL oscillator 140 are input to the AND gate 148. The AND gate 148 generates the write clock WCK for writing only a signal component necessary for constituting an NTSC frame, which is selected from all the outputs from the image pickup element 12', in the memory 20'.

The image data written in the memory 20' in accordance with the write clock WCK thus obtained is read out in response to the read clock RCK (FIG. 9(4)) having the frequency 4 fnsc. The read clock RCK is used as a sampling clock to convert the readout digital data into an analog signal by the D/A converter 26'. An output from the D/A converter 26' is subjected to luminance processing by the luminance processing circuit 28 and color processing by the color processing circuit 30. Outputs from these processing circuits 28 and 30 are converted into an NTSC composite video signal by the NTSC encoder 32.

In the above arrangement, an aspect ratio in the PAL mode is 1:1.202, while an aspect ratio in the NTSC mode is 1:1.248, thus causing an error of about 4.6%. In this case, this error does not almost appear as noise on the screen, thus posing no problem.

Figure 11:
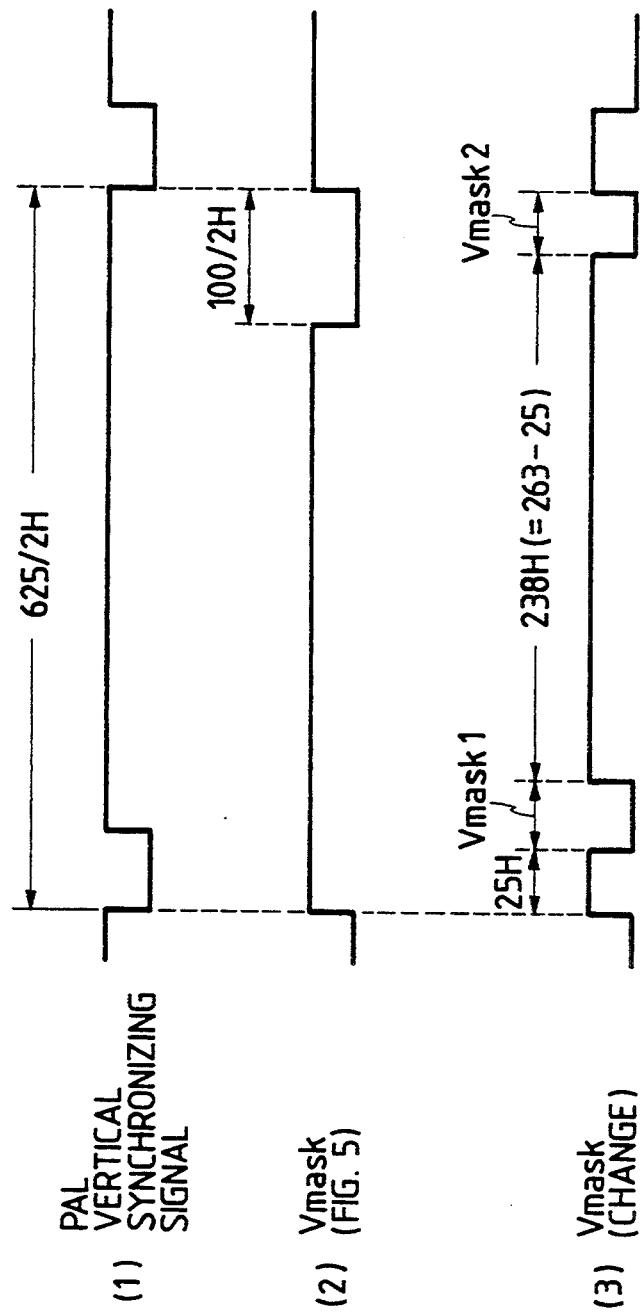
FIGS. 11 and 12 are timing charts of vertical and horizontal scanning operations when a write mask position in the NTSC mode is changed.

In the above embodiment, the second halves of the horizontal and vertical scanning periods of the PAL signal are masked to obtain an NTSC signal. With this arrangement, a predetermined portion of the image pickup surface, i.e., a photoelectric conversion surface of the image pickup element 12' is utilized. To the contrary, assume that the counters 144 and 146 comprise pluralities of counter stages, respectively. In this case, horizontal mask signals generated on the right and left sides during the horizontal scanning period, and vertical mask signals are generated on the upper and lower sides during the vertical scanning period. A video signal of an arbitrary portion can be converted from a PAL signal to an NTSC signal. FIGS. 11(1) to 11(3) are timing charts in vertical scanning in order to compare a state before conversion with a state after conversion, and FIGS. 12(1) to 12(3) are timing charts showing corresponding horizontal scanning.

For example, in a vertical synchronizing signal, after a PAL field blanking period (25 H) is counted, a first vertical mask signal Vmask1 is generated for a predetermined period of time, as shown in FIG. 11(3). Upon a lapse of a period of 238 H, a second vertical mask signal Vmask2 is generated. In this case, a total mask period of the first and second vertical mask periods is set to be 50 H. A ratio of the period of the first vertical mask signal to that of the second vertical mask signal is controlled to arbitrarily vertically set the NTSC area within the range of 0 to 50 H on the image pickup surface of the image pickup element 12'. Note that the first vertical mask signal Vmask1 may be started upon counting of 20 H pulses of the PAL vertical synchronizing signal so as to coincide with the NTSC field blanking period (20 H). In this case, a total masking period of the first and second vertical mask signals Vmask1 and Vmask2 is defined as 55 H. In this case, the area of the NTSC scheme can vertically arbitrarily fall within the range of 0 to 50 H on the image pickup surface of the image pickup element 12'. The NTSC area can be set in units of 5 H.

Figure 12:
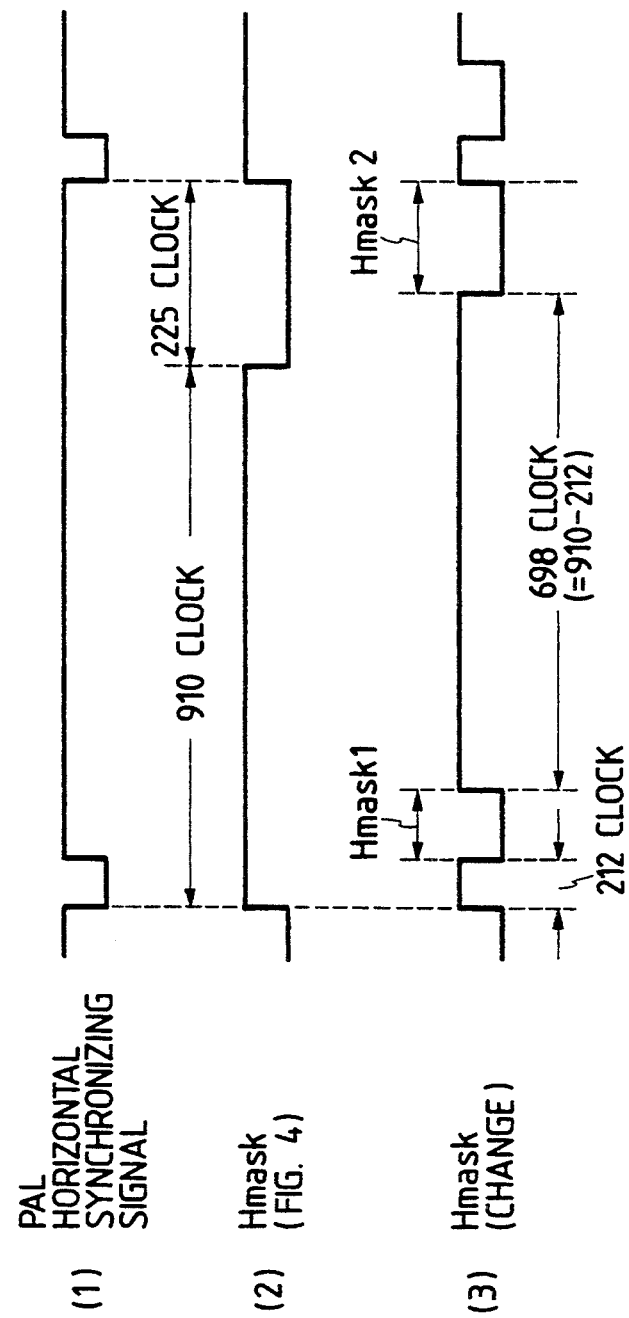

As shown in FIG. 12(3) as in the horizontal synchronizing signal, after counting of the horizontal blanking period (212 clocks), a first horizontal mask signal Hmask1 is generated for a predetermined period of time. After 698 pulses of the first horizontal mask signal Hmask1 are counted, a second horizontal mask signal Hmask2 is generated. A total period of the first and second horizontal mask signals is set to correspond to 225 clocks in the same manner as described with reference to FIGS. 9(1) to 9(5). When a ratio of the mask period defined by the first horizontal mask signal to that by the second horizontal mask signal is appropriately selected, the area of the NTSC scheme can be horizontally shifted within the range of 0 to 225 clocks on the image pickup surface of the image pickup element 12'.

In the above embodiment, since each of the PAL and NTSC modes has a frequency four times the color subcarrier frequency, the aspect ratio of each pixel is not set to be 1:1. In the fields which do not process composite video signals as in image processing and a still camera (so-called card camera) for digitally recording a pickup image signal in a memory card, the sampling frequency need not be an integer multiple of the color subcarrier frequency. Furthermore, judging from image processing, an aspect ratio of each pixel as 1:1 facilitates image processing. An embodiment for keeping an aspect ratio of each pixel to be 1:1 will be described below.

Figure 13:
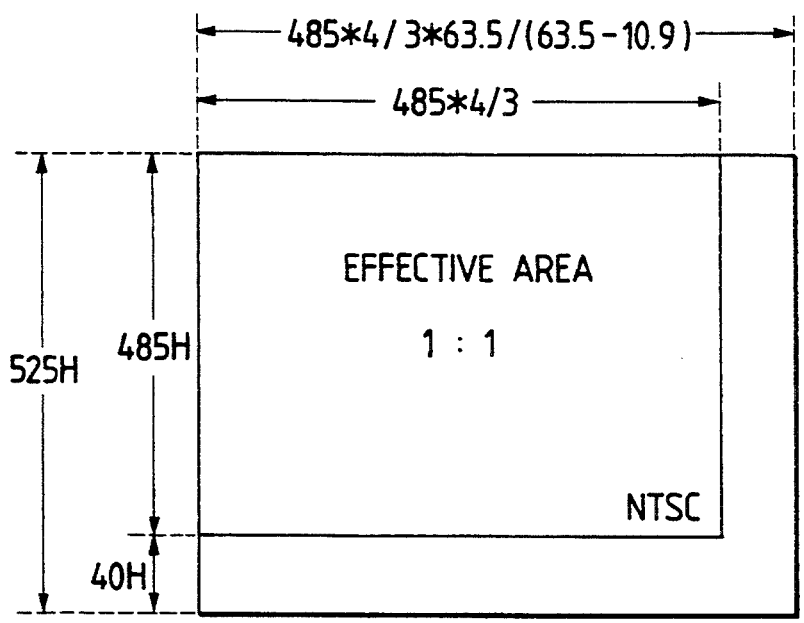
FIG. 13 is a view showing an NTSC frame satisfying an aspect ratio of 1:1.

Since a vertical blanking period of the NTSC mode is 20 H, an effective scanning line count is 485 ($=525-20\times2$). An aspect ratio of a normal TV screen is 3:4, so that an effective horizontal pixel count is $485\times4/3$. A total horizontal pixel count is given as follows if a horizontal blanking period is 10.9 $\mu$s:

$485\times4/3\times63.5/(63.5-10.9)\simeq780$. This relationship is shown in FIG. 13. If the sampling frequency is set to be $780/63.5$ $\mu$s $=12.294$ MHz, the aspect ratio of one pixel on the frame can be set to 1:1.

Figure 14:
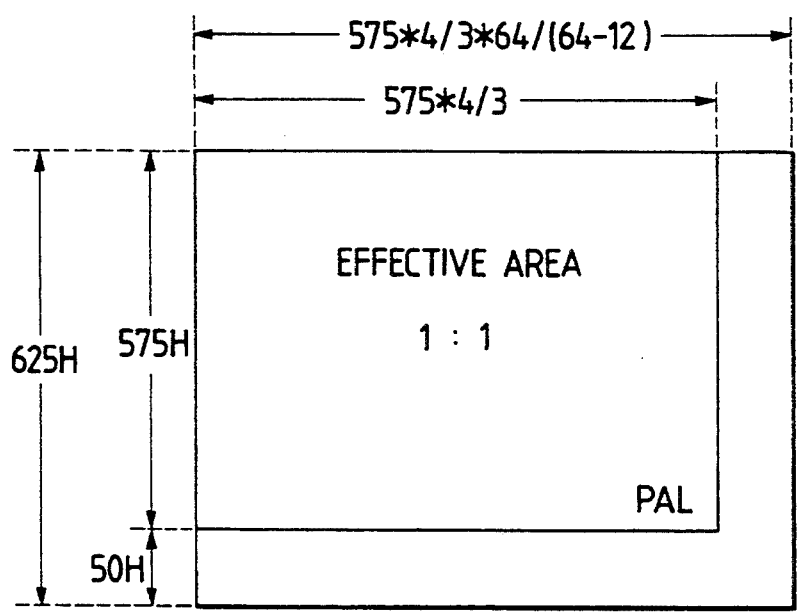
FIG. 14 is a view showing a PAL frame satisfying an aspect ratio of 1:1.

In the PAL mode, since the vertical blanking period is 25 H, an effective scanning line count is 575 ($=675-25\times2$), and the aspect ratio of the normal TV screen is 3:4, so that the effective vertical pixel count is $575\times4/3$. Therefore, a total horizontal pixel count is given as follows when the horizontal blanking period is 12 $\mu$s:

$575\times4/3\times64(64-12)\simeq943$. This relationship is shown in FIG. 14. If the sampling frequency is given as $943/64$ $\mu$s $=14.74$ MHz, an aspect ratio of one pixel on the frame becomes 1:1.

Figure 15:
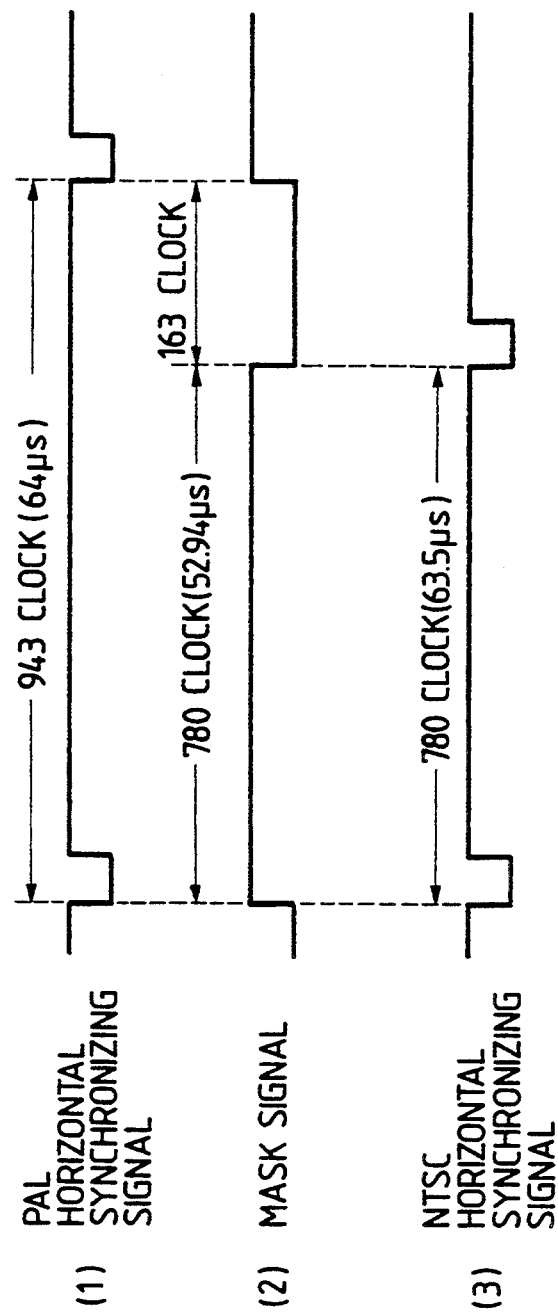
FIG. 15 is a timing chart for obtaining a pixel having an aspect ratio of 1:1.

Judging from the above results, in the NTSC mode, the oscillation frequency of the PAL oscillator 140 in FIG. 8 is set to be 14.74 MHz, and the oscillation frequency of the NTSC oscillator 142 is set to 12.29 MHz. Write access of the memory 20' is performed in response to a clock obtained by masking the output clock with the mask signal shown in FIG. 15(2). In the read mode of the memory 20', the output clock of the NTSC oscillator 142 is set to be a read clock for the memory 20'. Therefore, the memory 20' or the D/A converter 126 outputs an NTSC image signal having an aspect ratio of about 1:1. The vertical value becomes 1.19 ($\simeq625/525$) and the horizontal value is 1.199 ($=63.5/52.94$) since 780 clocks of 14.74 MHz correspond to a period of 52.94 $\mu$s. Therefore, the aspect ratio of one pixel becomes almost 1:1.

As described above, a frequency except for an integer multiple of the color subcarrier frequency is used as a sampling clock. In order to obtain a composite video signal, clock oscillators are required for encoders 132 and 134. However, when signals are recorded in the forms of a luminance signal and color difference signals or RGB signals on a recording medium, encoders 128 and 130 need not be used. A composite video signal can be obtained by a composite output unit which receives another luminance signal and other color difference or RGB signals.

Conversion from the PAL scheme to the NTSC scheme has been described. However, conversion from a SECAM scheme to the NTSC scheme can similarly be performed.

As can be easily understood from the above description, according to the present invention, a simple arrangement can perform conversion of different television schemes.

In the above embodiment, a reading method of the image pickup element is not changed, and television scheme conversion is performed by processing using memories. However, in the following embodiment, a drive method of an image pickup element is controlled to output an image signal compatible with different television schemes with reference to FIGS. 16 to 27.

Figure 25:
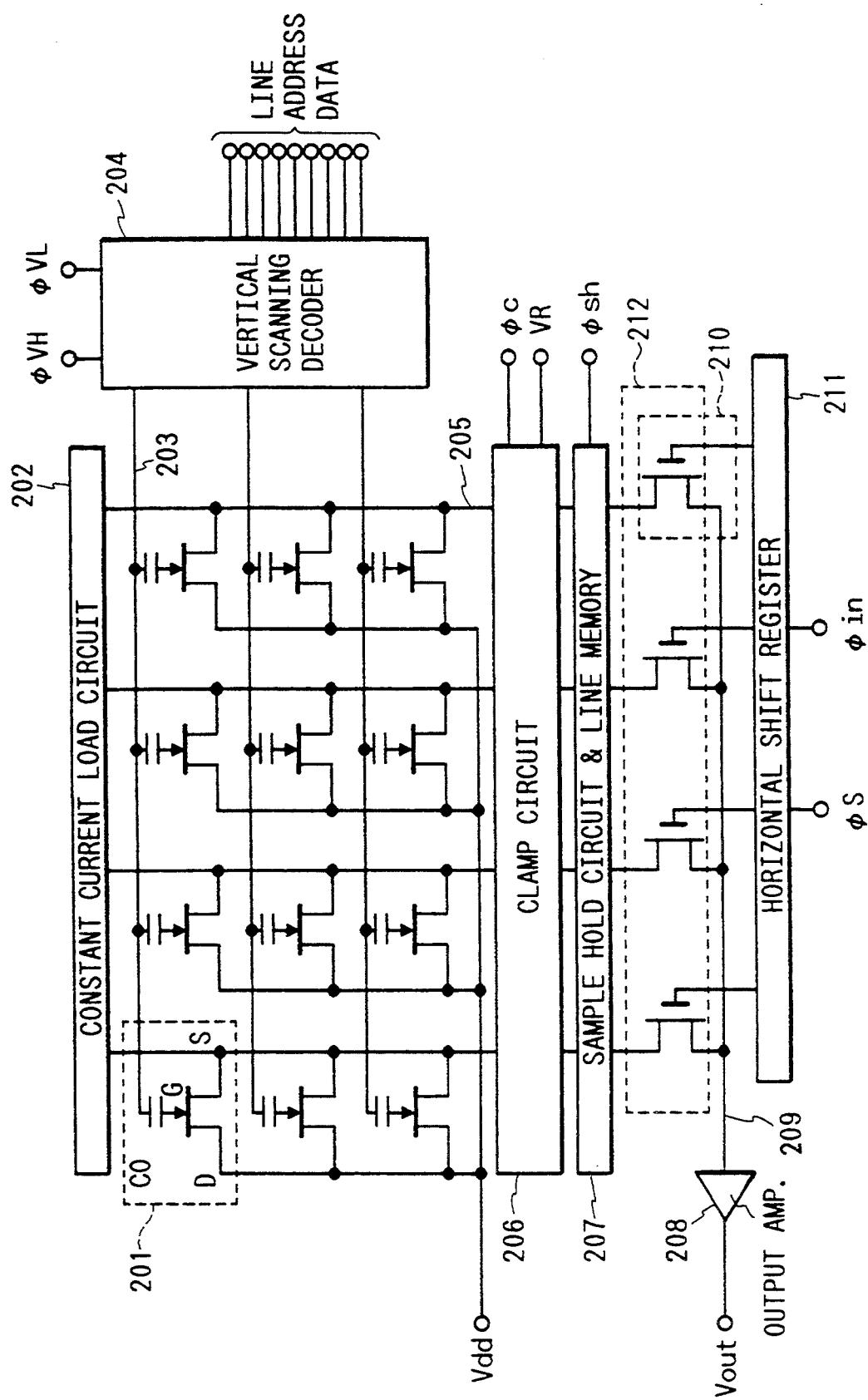
FIG. 25 is a diagram showing an FGA sensor structure.

FIG. 25 is a view showing a kind of solid state image pickup element as a one-chip structure of an FGA sensor capable of randomly selecting vertical scanning lines. A detailed description of the FGA sensor is given in (IEEE TRANSACTION OF ELECTRON DEVICE, Vol. 35, No. 5, May 1988, pp. 646-652), and this sensor will be briefly described below.

Referring to FIG. 25, a light-receiving element 201 is constituted by a JFET (Junction Field Effect Transistor) and a coupling capacitor C0 connected between the gate of the JFET and a horizontal address line 203. A load capacitor (constant current load circuit) 202 serves as a JFET source capacitor constituting the light-receiving element 201. The load capacitor 202 constitutes a source follower together with the JFET of the light-receiving element 201. Each horizontal address line 203 is commonly capacitively coupled to the gates of JFETs of the light-receiving elements 201 constituting one horizontal line through the corresponding capacitors C0.

A vertical scanning decoder 204 supplies a reset pulse $\Phi$VH to the horizontal address line of the horizontal line selected by line address data and an off pulse $\Phi$VL to horizontal address lines of the non-selected horizontal lines. When the reset pulse $\Phi$VH is set at low level, the JFET of the light-receiving element 201 is turned on, and a gate potential appears at the source of the JFET. When the reset pulse $\Phi$VH is set at high level, the coupling capacitor C0 of the light-receiving element is charged in a predetermined charge amount. The potential of the light-receiving element 201 is reset to a predetermined potential. When the off pulse $\Phi$VL is set at high level, the JFET of the light-receiving element 201 is turned on, and the gate potential appears at its source. When the off pulse $\Phi$VL is set at low level, the JFET of the light-receiving element 201 turned off, and the gate potential does not appear at the output terminal.

Each vertical signal line 205 is commonly connected to the sources of the light-receiving elements 201 on the same vertical line. A gate potential of the light-receiving element of the horizontal line selected by the vertical scanning decoder appears on this vertical signal line 205. Clamp circuits 206 have the same number as that of the vertical signal lines 205. The clamp circuits 206 clamp potentials of the corresponding vertical signal lines 205 to a reference potential VR when the clamp pulses $\Phi$c are set at high level, respectively.

A sample hold circuit & line memory 207 comprises hold capacitors having the same number as that of the vertical signal lines 205 and switches having the same number as that of the vertical signal lines 205. The hold capacitors and the switches sample the potential levels of the vertical signal lines when pulses $\Phi$sh are set at high level and hold potentials when the pulses go to low. The hold capacitors disconnected from the corresponding vertical signal lines serve as horizontal line memories.

An output amplifier 208 outputs the potential of each horizontal signal line 209. A switch 210 connects a signal from the sample hold circuit & line memory 207 to a horizontal signal line 209 and is scanned by a horizontal shift register 211. A switch array 212 is constituted by switches 210.

Figure 26:
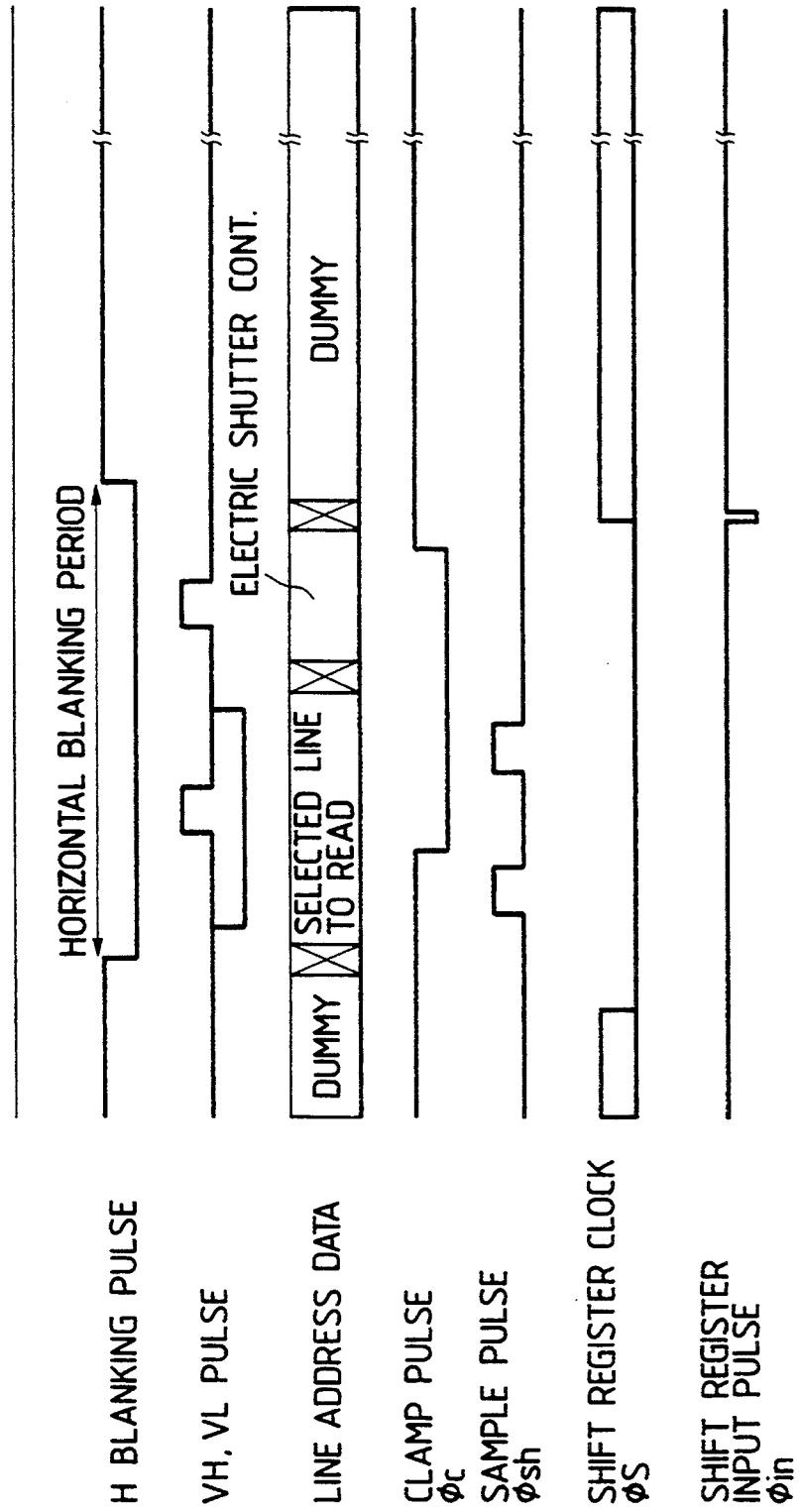
FIG. 26 is a timing chart of an operation of the FGA sensor.

FIG. 26 is a timing chart showing an operation of the FGA sensor. Line address data is set immediately after the horizontal blanking period is started. When the off pulse ΦVL is set at low level, the JFETs of the light-receiving elements 201 of the horizontal lines except for the selected horizontal line are turned off, and only the signal of the selected horizontal line appears on the vertical signal line 205. This signal is clamped to the reference potential VR in response to the clamp pulse Φc, and the level of this signal is sampled/held by the sample hold pulse Φsh. When the clamp pulse Φc becomes low, and the reset pulse Φ then becomes high, the charges of all the light-receiving elements 201 of the selected horizontal line are reset, and the output on the vertical signal line 205 is changed.

After the reset pulse ΦVH goes to low, the potential appearing on the vertical signal line 205 is sampled and held in response to the sample hold pulse Φsh. A change in potential before and after resetting of the light-receiving element 201 is stored in the sample hold circuit & line memory 207. The off pulse ΦVL then goes to an intermediate potential. In order to control the storage period, an address of a horizontal line to be reset is set as line address data, and the reset pulse ΦVH goes to high. Therefore, the charge of the light-receiving element 201 of the designated horizontal line is reset.

When this operation is completed, the clamp pulse Φc goes to high again to clamp the potential of the vertical signal line 205. Scanning of the sample hold circuit & line memory 207 is started by the horizontal shift register 211, thereby completing the horizontal blanking period. Vertical scanning can be randomly performed by applying line address data. The storage period can be set by applying the address of the horizontal line to be reset by several Hs prior to read access, thereby providing an electronic shutter operation of a focal plane.

Figure 27:
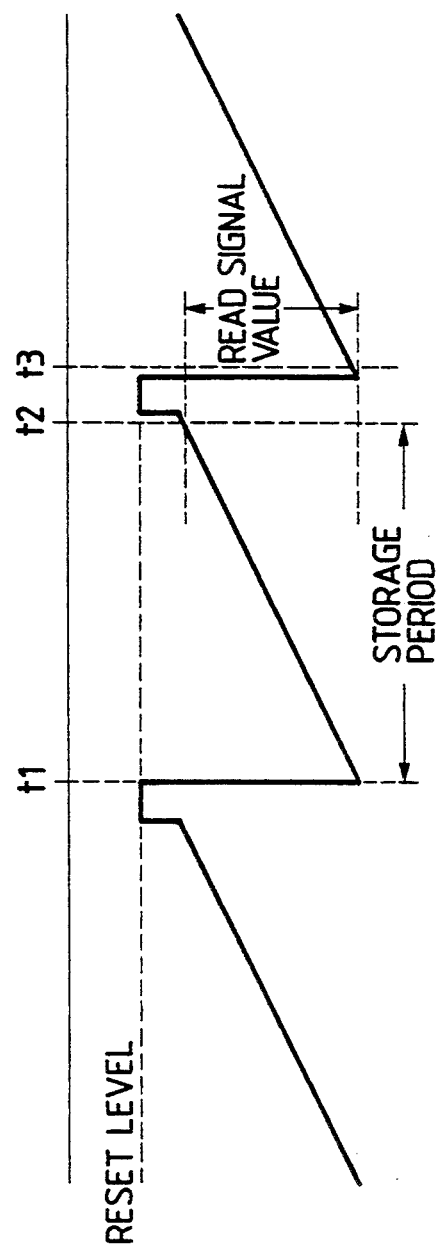
FIG. 27 is a chart showing a change in output from a light-receiving element.

FIG. 27 is a view showing a change in output from the light-receiving element 201. The output is reset in response to the reset pulse ΦVH at time t1. Thereafter, if light radiation is present, an output potential is increased with a lapse of time. The potential of the sample hold circuit & line memory 207 is clamped to a potential immediately before the memory is reset again at time t2. A potential upon resetting of the memory 207 is sampled and held at time t3, thereby obtaining a read signal value.

Figure 16:
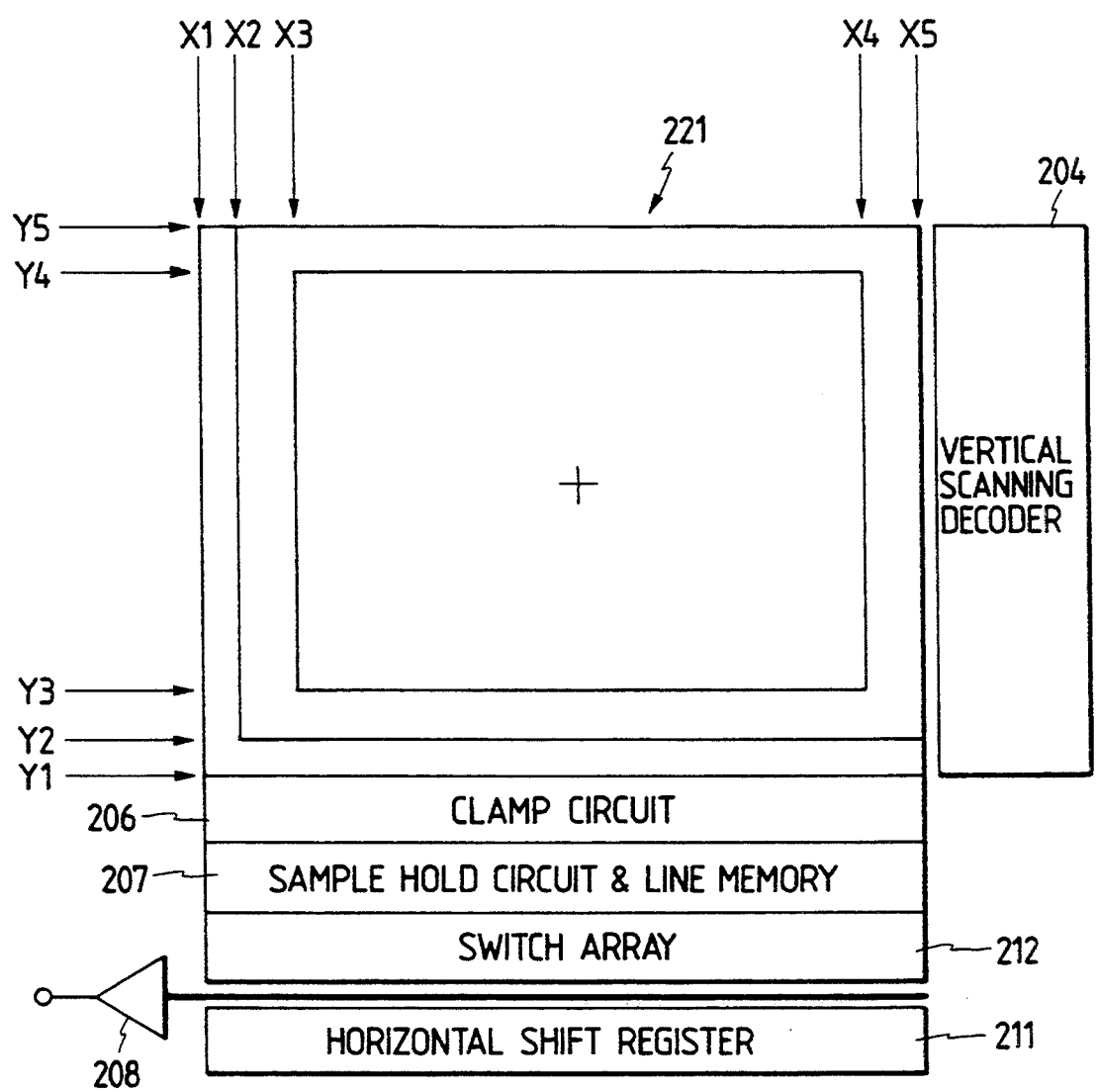
FIG. 16 is a view for explaining scanning ranges of a solid state image pickup element in the NTSC and PAL modes according to still another embodiment of the present invention.

FIG. 16 shows a view for explaining scanning ranges of a solid state image pickup element (FGA sensor) 221 in the NTSC and PAL modes. The numbers of pixels in the horizontal and vertical directions include necessary numbers of pixels in the PAL mode. Vertical address numbers of the horizontal line are represented by reference symbols Y1 to Y5. Y1 to Y2−1 represent optical black pixels which represent an area of a black level reference signal. Y2 to Y5 represent an area corresponding to the number of scanning lines of the effective period in the PAL scheme and normally include about 580 scanning lines. Y3 to Y4 represent an area corresponding to the effective pixel scanning lines in the NTSC scheme and normally include about 480 scanning lines.

Horizontal address numbers of the vertical line are represented by reference symbols X1 to X5. X1 to X2−1 represent horizontal optical black pixels. The level of this pixel is clamped every horizontal scanning period to obtain a reference signal of a black reference level. X2 to X5 represent an area output during the effective period in the PAL scheme. The area represented by the X2 to X5 is determined to be 4 when the area represented by the Y2 to Y5 is defined as 3. X3 to X4 represents an area output during the effective period in the NTSC scheme. The area represented by the X3 to X4 is given as 4 when the area represented by the Y3 to Y4 is defined as 3.

FIG. 17 is a timing chart for explaining read access of the solid state image pickup element 221 in the PAL mode and read access thereof in the NTSC mode. In the PAL mode, during the vertical blanking period, address data of address numbers Y2 to Y2−1 are supplied as line address data to read the optical black portion having the address numbers Y1 to Y2−1. During the vertical effective period, address data of the address numbers Y2 to Y5 are given as line address data, and data of the address numbers Y2 to Y5 is read out. In the NTSC mode, during the vertical blanking period, the optical black portion is read out as in the PAL mode. During the vertical effective period, the address data of the address numbers Y3 to Y4 are supplied as the line address data to read out data from the area represented by the address numbers Y3 to Y3.

In vertical scanning, the line address data are supplied as in the FGA sensor having the structure shown in FIG. 25, and a portion unnecessary for the NTSC scheme is skipped for reading during vertical scanning, thereby using an NTSC solid state image pickup element having the number of PAL pixels.

Horizontal reading will be described below. FIGS. 18A to 19B are views showing the structure of a horizontal shift register of the solid state image pickup element 221 for performing reading skip of an unnecessary portion in the NTSC mode, and drive methods of this horizontal shift register.

A shift register is generally constituted by a plurality of series-connected flip-flops which parallely receive the clock ΦS. A start pulse Φin is continuously shifted in response to the clock ΦS. The shift register shown in FIGS. 18A and 18B are different from that of a conventional shift register in that switches 213, 214, 215, and 216 for performing recording skip of the unnecessary portion in the NTSC mode are provided.

The switch 213 is connected between the stage corresponding to the address number X2−1 of the shift register (FIG. 16) and the stage corresponding to the address number X2 and enables/disables interstage pulse transmission. The switch 214 enables/disables pulse transmission from the stage corresponding to the address number X3−1. The switch 215 is a switch for enabling/disabling pulse transmission from the stage corresponding to the address number X2−1. The switch 216 enables/disables the pulse transmission from the stage corresponding to the address number X4 and the stage corresponding to the address number X4+1. When the switch 216 is turned off, an input to the stage corresponding to the address number X4+1 is grounded.

FIGS. 18A and 18B show set states of the switches in the PAL mode. The switch 213 is connected to the immediately preceding stage, the switches 214 and 216 are connected to the immediately preceding stages, and the switch 215 is turned off. When these switches are set as described above, all the horizontal pixels are scanned, so that a signal corresponding to the PAL scheme can be obtained.

Figure 19A:
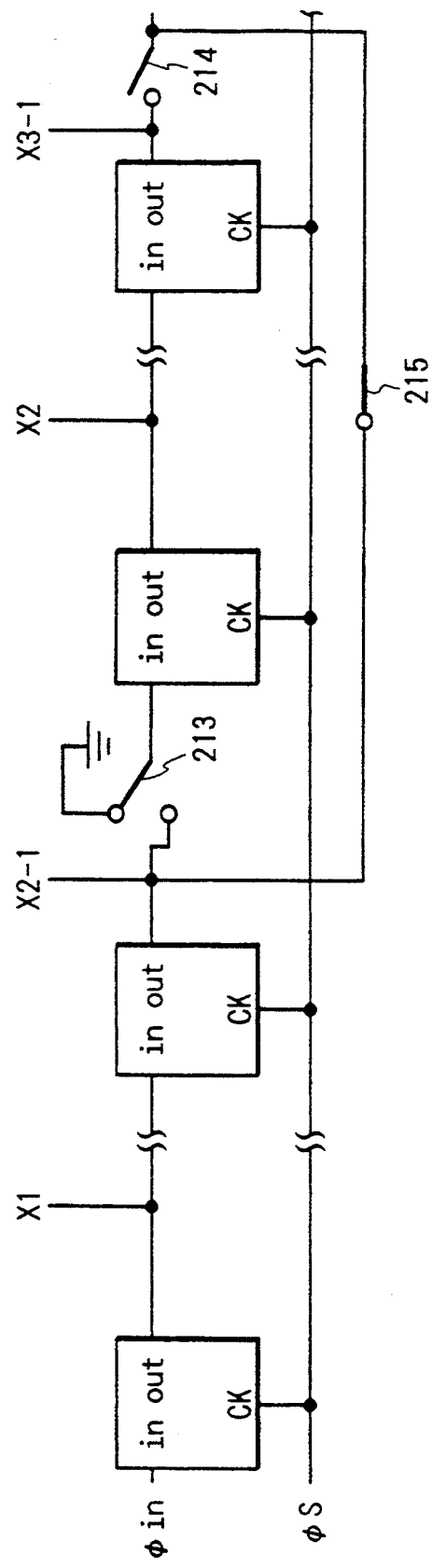
FIGS. 19A and 19B are diagrams showing set states of switches in the NTSC mode.
Figure 19B:
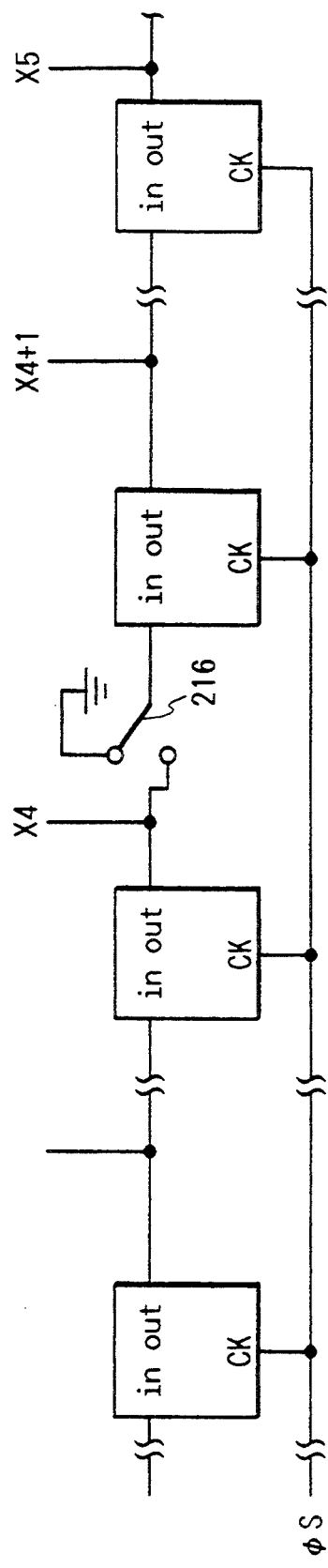

FIGS. 19A and 19B show set states of the switches in the NTSC mode. The switches 213 and 216 are grounded, the switch 214 is kept off, and the switch 215 is kept on. In this state, after scanning from the address number X2 to the address number X2−1 is completed, scanning skip is performed for X2 to X3−1, and only a portion of X3 to X4 is scanned, thereby completing horizontal scanning. In this manner, only an area corresponding to the NTSC scheme can be scanned.

Figure 20:
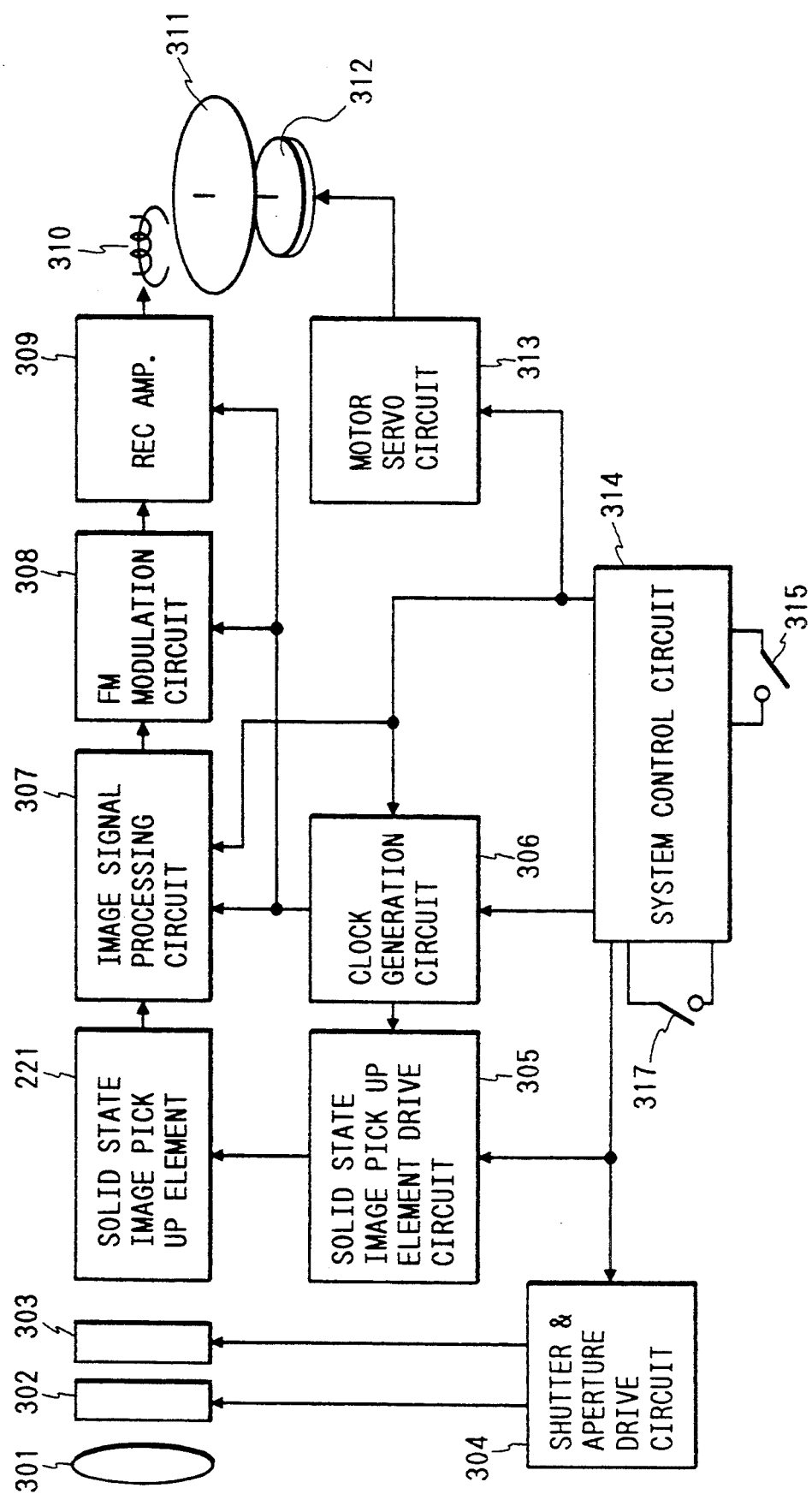
FIG. 20 is a block diagram showing an arrangement of an NTSC/PAL compatible camera as an electronic still camera.

FIG. 20 is a block diagram showing an NTSC/PAL compatible camera employing the above-mentioned solid state image pickup element and its drive method as an electronic still camera.

This electronic still camera includes a lens 301, an aperture 302, a shutter 303, a shutter & aperture drive circuit 304, a solid state image pickup element 221, a solid state image pickup element drive circuit 305. The shutter & aperture drive circuit 304 drives the shutter 303 and the aperture 302 in accordance with a control signal from a system control circuit 314. The solid state image pickup element 221 comprises the FGA sensor. The solid state image pickup element drive circuit 305 generates line address data corresponding to the preset NTSC or PAL scheme to perform reading and driving in the vertical direction. At the same time, the solid state image pickup element drive circuit 305 performs driving such as high-speed pixel reading (to be described later) and controls the solid state image pickup element 221.

The electronic still camera of this embodiment also includes a clock generation circuit 306 and a signal processing circuit 307. The signal processing circuit 307 processes the signal output from the solid state image pickup element 221 to obtain a luminance signal and color difference line sequential signals. A color filter array is formed on the respective pixels of the solid state image pickup element. A luminance signal and color difference signals are obtained from one solid state image pickup element according to any known method (a description thereof will be omitted).

The electronic still camera further includes an FM modulation circuit 308, a REC amplifier 309, a magnetic head 310, a magnetic sheet 311, a motor 312, a motor servo circuit 313, the system controller 314, and a shutter release switch 315. The FM modulation circuit 308 sequentially FM-modulates the luminance signal and the color different line sequential signals. The REC amplifier 309 amplifies the FM-modulated signals so as to allow magnetic recording. The magnetic sheet 311 serves as a recording medium. The motor 312 drives to rotate the magnetic sheet 311. The system control circuit 314 controls the overall operation of the system. A series of still image pickup sequences controlled by the system control circuit 314 is started in synchronism with an ON timing of the shutter release switch 315.

A switch 317 is a switch for selecting the NTSC or PAL mode. When the switch 317 is turned on, the NTSC mode is selected. When the switch 317 is turned off, the PAL mode is selected. For example, this switch is manually operated. In response to an ON/OFF selection signal from this switch 317, an oscillation frequency and an output clock timing of the clock generation circuit, a speed of the motor 312, and a synchronizing signal supplied to the image signal processing circuit 307 are changed. The selection signal from the switch 317 is also supplied to the solid state image pickup element drive circuit 305. The solid state image pickup element drive circuit 305 drives the solid state image pickup element 221 in accordance with the NTSC or PAL mode, thereby causing the electronic still camera to serve as an NTSC/PAL compatible camera.

Figure 21:
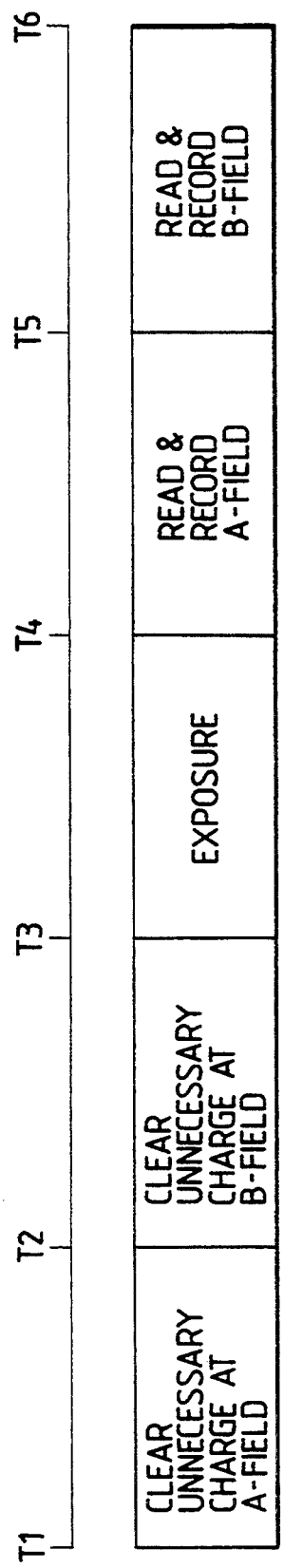
FIG. 21 is a view showing a drive sequence of the electronic still camera.

FIG. 21 is a view showing the drive sequence of the electronic still camera. At time T1, when the shutter release switch 315 is turned on, an unnecessary charge of pixels corresponding to an A-field such as an odd field is cleared. At time T2, an unnecessary charge of pixels corresponding to a B-field such as an even field is cleared. At time T3, the shutter 303 is opened to start an exposure operation. From time T4, reading of light-receiving element information of the A-field is started. At the same time, the readout signal is processed and is recorded as a still image on the magnetic sheet 311. From time T5, reading of light-receiving element information of the A-field is started, and at the same time, its signal processing is performed. The processed signal is stored as a still image on the magnetic sheet 311.

FIG. 22 shows a modification of a drive method for the horizontal shift register for performing reading skip of the unnecessary horizontal charge without arranging the switches shown in FIGS. 18A and 18B. Prior to scanning of the effective area, the optical black signal is read at a normal drive frequency during the horizontal blanking period. Scanning corresponding to a time interval corresponding to the address numbers X2 to X3−1 is performed in response to high-speed pulses. Scanning from the address numbers X3 to X4 is performed in response to normal pluses, and then scanning from the address numbers X4+1 to X5 is performed in response to high-speed pulses. By this method, the solid state image pickup element drive circuit 305 is caused to control the solid image pickup element 221 so that the unnecessary charge is read within a short period of time. By this drive method, the unnecessary portion can be skipped without arranging the switches shown in FIGS. 18A and 18B.

Figure 24:
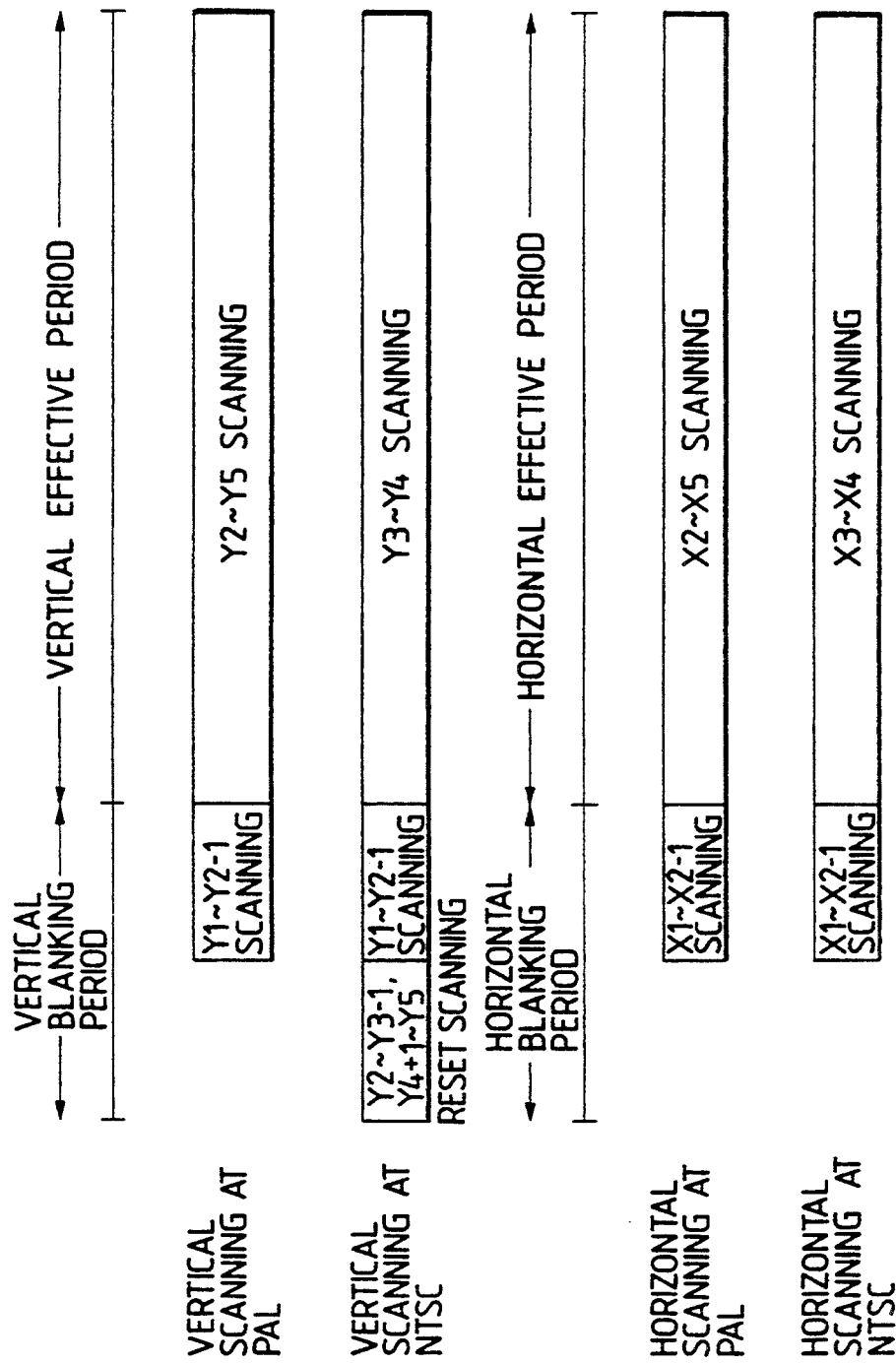
FIG. 24 is a view showing a drive method for inhibiting blooming in the NTSC mode using a high-speed reset drive method.

FIG. 23 shows a method of quickly clearing the light-receiving portion not subjected to read access in the NTSC mode. As shown in FIG. 23, reset addresses are sequentially supplied as line address data to set the reset pulse $\Phi VH$ high, so that the light-receiving elements of the unnecessary horizontal lines are cleared at high speed. FIG. 24 shows a drive method of preventing blooming in the NTSC mode by using this high-speed reset drive method. The drive method of FIG. 24 is substantially the same as that of FIG. 17 except that the light-receiving elements of the area not subjected to read access in the NTSC mode are reset at addresses represented by the numbers Y2 to Y3−1 and Y4+1 to Y5 during the vertical blanking period. By this operation, an excessive charge is not stored in the area not subjected to read access, thereby preventing blooming.

As described above, in order to extract signals complying with the NTSC scheme, an operation for performing reading skip of unnecessary vertical and horizontal portions, or a high-speed reading operation thereof is performed to use a solid state image pickup element having the number of pixels corresponding to the PAL scheme in the NTSC scheme. Therefore, an image pickup apparatus compatible with both the NTSC and PAL schemes can be obtained.

Changes and modifications of the above embodiments may be made without departing the spirit and scope of the invention.

In the above embodiment, the NTSC and PAL schemes are exemplified. However, the present invention is also applicable to other television schemes having different scanning ranges, such as a high-definition television scheme called a "high-vision" scheme.

The above embodiment exemplifies the electronic still camera. However, the present invention is also applicable as a movie camera compatible with television schemes having different scanning ranges by continuously performing the above operations.

The switches 213, 214, 215, and 216 are replaced with AND gates or the like to perform automatic switching of the horizontal shift register for the NTSC and PAL schemes.

As described above, in the image pickup apparatus of the present invention, by using an image pickup element having the numbers of horizontal and vertical pixels corresponding to a television scheme having a larger scanning range, if a television scheme having a narrow scanning range is employed, unnecessary pixels are subjected to reading skip or are read at high speed. Therefore, there is provided an image pickup apparatus having one image pickup element coping with television schemes having different scanning ranges.

In each of the embodiments described above, a memory in the image pickup apparatus or a drive method of the image pickup element itself is controlled to disclose an apparatus applicable to various types of television schemes. An embodiment capable of regenerating an image signal recorded by a predetermined television scheme on a medium in accordance with another television scheme will be described from FIG. 28.

Figure 28:
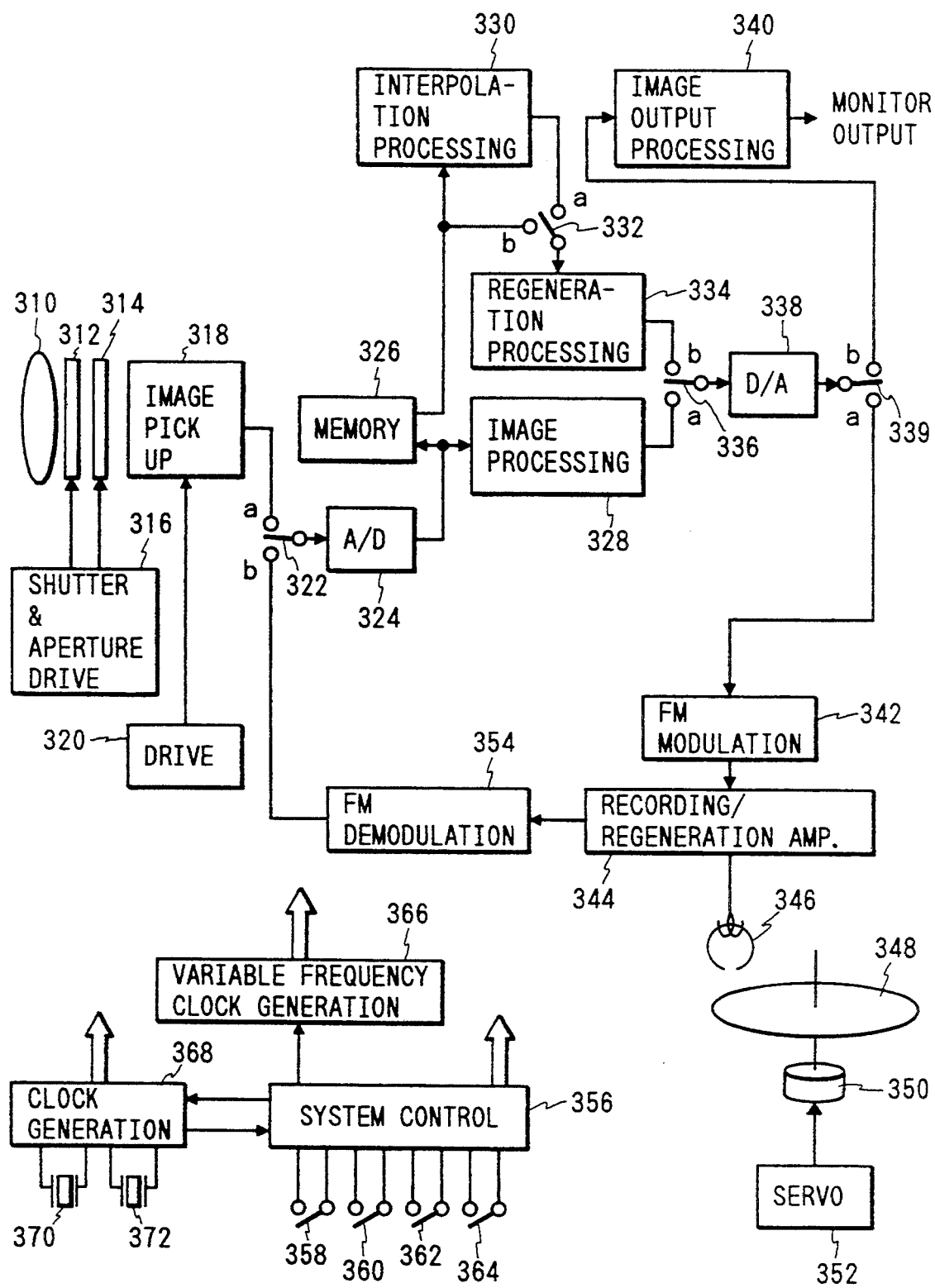
FIG. 28 is a block diagram showing an arrangement according to still another embodiment of the present invention.

FIG. 28 is a block diagram showing an electronic still camera having a regeneration function according to still another embodiment of the present invention. A pickup image can be recorded on a magnetic sheet or floppy disk as a recording medium in either the NTSC or the PAL mode, and a recorded image can be regenerated in either the NTSC mode or the PAL mode.

The electronic still camera shown in FIG. 28 comprises a photographic lens 310, an aperture 312, a shutter 314, an aperture 316, a shutter & aperture drive circuit 316 for driving the aperture 312 and the shutter 314, a solid state image pickup element 318 having the number of pixels corresponding to the NTSC scheme, an image pickup element drive circuit 320 for driving the image pickup element 318, a switch 322 set at a position of a contact a in the recording mode and set at a position of a contact b in the regeneration mode, and an A/D converter 324.

The electronic still camera also includes a frame memory 326, an image processing circuit 328, an interpolation processing circuit 330, a switch 332, a regeneration processing circuit 334, a switch 336, and a D/A converter 338. The frame memory 326 includes two input/output ports, i.e., the first port used to receive an output signal from the A/D converter 324 and perform signal reading in the recording mode, and the second port used to perform signal reading in the regeneration mode. The image processing circuit 328 performs image processing such as gamma conversion of the pickup image signal. The interpolation processing circuit 330 performs vertical interpolation processing in the regeneration mode. The switch 332 selects the presence/absence of interpolation processing of the interpolation processing circuit 330. The regeneration processing circuit 334 performs regeneration processing such as edge correction in the regeneration mode. The switch 336 is set at a position of a contact a (i.e., an output from the image processing circuit 328) in the recording mode and is set at a position of a contact b (i.e., an output from the regeneration processing circuit 334) in the regeneration mode. The D/A converter 336 converts a signal selected by the switch 336 into an analog signal.

The electronic still camera also includes a switch 339, an image output processing circuit 340, an FM modulation circuit 342, a recording/regeneration amplifier 344, a recording/regeneration magnetic head 346, a magnetic sheet 348, a motor 350, a servo circuit 352, and an FM demodulation circuit 354. The switch 339 is set at a position of a contact a in the recording mode and is set at a position of a contact b in the regeneration mode. The image output processing circuit 340 adds a synchronizing signal and the like to a signal from the contact b of the switch 339 and outputs an image signal of a designated television scheme. The FM modulation circuit 342 performs FM modulation for recording information on the recording medium constituted by the magnetic sheet 348. The motor 350 rotates the magnetic sheet 348. The servo circuit 352 controls rotation of the motor 350. The FM demodulation circuit 354 FM-demodulates a regeneration output from the recording/regeneration amplifier 344. An output from the FM demodulation circuit 354 is applied to the contact b of the switch 322.

The electronic still camera further includes a system control circuit 356 for controlling the overall operation, a recording/regeneration mode selection switch 358, a recording trigger switch 360 for designating the start of recording, an NTSC/PAL mode selection switch 362 operated in the regeneration mode, a display switching switch 364 operated in the regeneration mode, a variable frequency clock generation circuit 366, a clock generation circuit 368, and oscillators 370 and 372. The clock generation circuit 366 generates control clocks to the A/D converter 324, the D/A converter 338, and the frame memory 326 in the regeneration mode. The clock generation circuit 368 generates clocks required for components except for the A/D converter 324, the D/A converter 338, and the frame memory 326. The oscillator 370 serves as a PAL regeneration clock oscillator, while the oscillator 372 serves as an NTSC recording/regeneration clock oscillator.

Operations in the recording mode will be described below. When the recording mode is designated by the recording/regeneration mode selection switch 358, the system control circuit 356 causes the switches 322, 336, and 339 to set at the positions of the contacts a. In this state, when the recording trigger switch 360 is turned on, a series of recording operations are started. More specifically, the magnetic sheet 348 is rotated at a predetermined speed by the motor 350 and the servo circuit 352. At the same time, the shutter 314 is kept open for a predetermined period of time by the shutter & aperture drive circuit 316 to expose the image pickup element 318. A signal charge obtained upon exposure is read by the image pickup element drive circuit 320 and is applied to the image processing circuit 328 through the switch 322 and the A/D converter 324. The image processing circuit 328 performs known processing such as gamma conversion. An output from the image processing circuit 328 is supplied to the FM modulation circuit 342 through the D/A converter 338 and the switch 339, thereby obtaining an FM-modulated signal. The FM-modulated signal from the FM modulation circuit 342 is amplified by the recording/regeneration amplifier 344. An output from the recording/regeneration circuit 344 is recorded on the magnetic sheet 348 with the magnetic head 346. In this recording mode, since the image pickup element 318 complies with the NTSC scheme, a frame image signal having the numbers of horizontal and vertical pixels complying with the NTSC scheme is recorded on the magnetic sheet 348.

An operation performed when the recording/regeneration mode selection switch 358 is set in the regeneration mode and the NTSC/PAL mode selection switch 362 designates the NTSC regeneration mode is set will be described below. At this time, the switches 322, 336, and 339 are set at the positions of the contacts b by the NTSC/PAL mode selection switch 362. The magnetic head 346 regenerates a recording signal of the first (odd) field from the magnetic sheet 346 rotated at the predetermined speed by the motor 350 and the servo circuit 352. An output from the magnetic head 346 is amplified by the recording/regeneration amplifier 344, and the amplified signal is applied to the FM demodulation circuit 354, thereby performing FM demodulation. An output from the FM demodulation circuit 354 is recorded in the frame memory 326 through the switch 322 and the A/D converter 324. Similarly, a recording signal of the second (even) field of the magnetic sheet 346 is regenerated and FM-demodulated. The signal is then stored in the frame memory 326.

Since the switch 332 is set at the position of the contact b, a signal read out from the frame memory 326 is applied to the regeneration processing circuit 334 through the switch 332 and is regenerated. An output signal from the regeneration processing circuit 334 is applied to the image output processing circuit 340 through the switch 336, the D/A converter 338, and the switch 339. The image output processing circuit 340 adds a synchronizing signal and the like to the input signal, and the composite signal is output to a monitor display (not shown).

An operation performed when the recording/regeneration mode selection switch 358 is set in the regeneration mode and the NTSC/PAL mode selection switch 362 designates the PAL regeneration mode will be described below. In this case, the switches 322, 336, and 339 are set at the positions of the contacts b, and then the switch 332 is set to the position of the contact a. Recording signals of the first (odd) and second (even) fields are regenerated from the magnetic sheet 348 rotated at the predetermined speed. The regenerated signals are FM-demodulated, and stored in the frame memory 326. The above operations are the same as those of the NTSC mode output, i.e., at the NTSC frequency. For example, a sampling clock having a frequency of 14.43 MHz is applied to the A/D converter 324.

Upon completion of storage in the frame memory 326, the frequency for the clock generated by the clock generation circuit 368 is switched to a PAL regeneration operating frequency. In the PAL regeneration mode, there are two display modes, i.e., a reduction display mode shown in FIG. 29A and an interpolation mode shown in FIG. 29B.

Figure 29A:
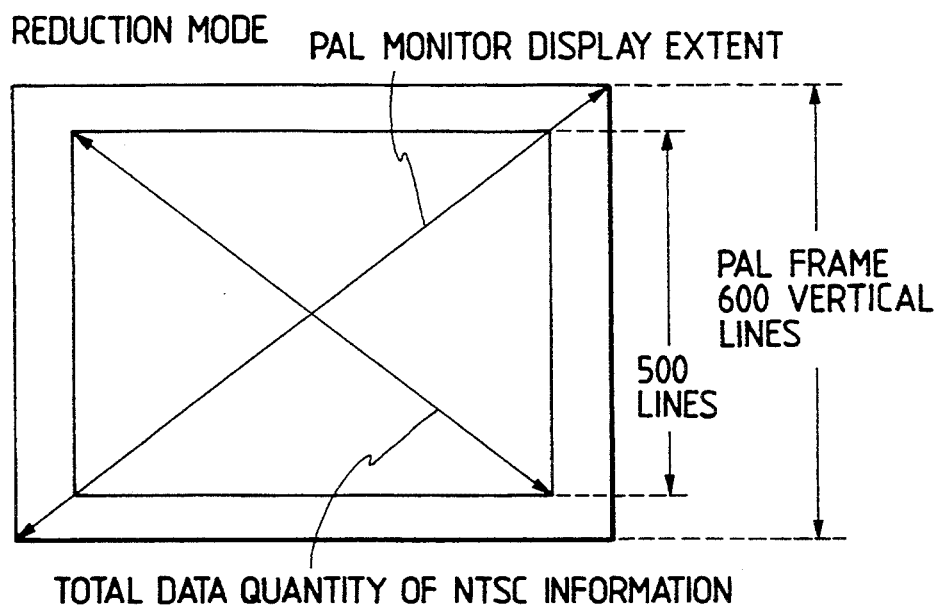
FIGS. 29A and 29B are views showing display modes for regenerating an NTSC image in the PAL mode.

In the reduction display mode shown in FIG. 29A, all pieces of NTSC information, i.e., information of about 500 scanning lines, of the central area of a PAL monitor display area (about 600 vertical scanning lines) are displayed. If the vertical length is given as 3, the horizontal length is set to be 4. In this manner, the frequency of the clock from the variable frequency clock generation circuit 366 is set to be, e.g., 17.3 MHz. This clock is input to the read clock input of the frame memory 326. At the same time, the horizontal and vertical read start timings are controlled so that an image is displayed at the central portion of the screen. In this display mode, the switch 332 is set at the position of the contact b, and interpolation processing by the interpolation processing circuit 330 is not performed. A signal read out from the frame memory 330 is applied to the regeneration processing circuit 334 through the switch 332 and is subjected to regeneration processing. An output signal from the regeneration processing circuit 334 is applied to the image output processing circuit 340 through the switch 336, the D/A converter 338, and the switch 339. The image output processing circuit 340 adds a synchronizing signal and the like to the input signal, and the composite signal is output to a monitor display (not shown). Therefore, a regenerated image is displayed at the center of the screen, as shown in FIG. 29A.

Figure 30:
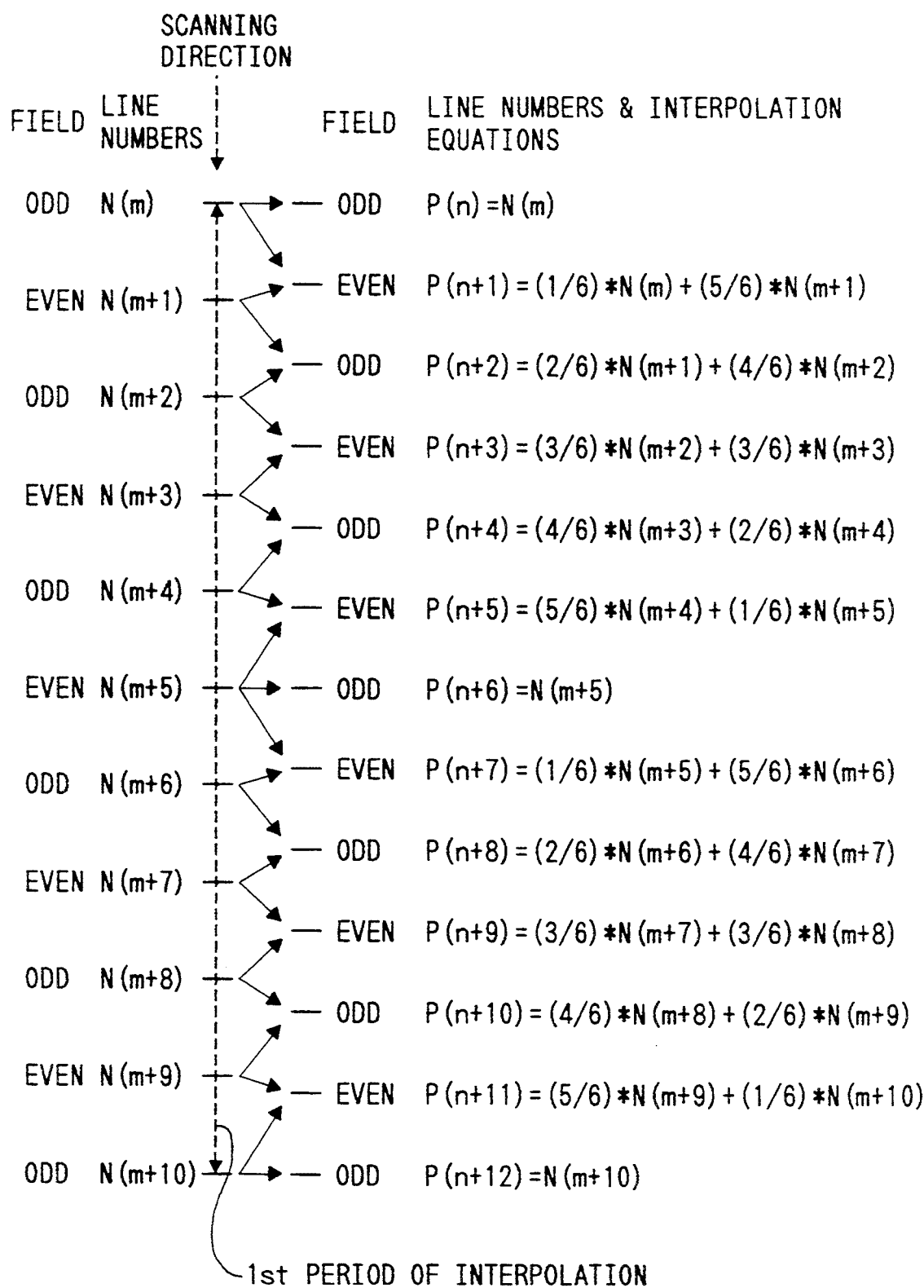
FIG. 30 is a view showing interpolation processing in the case of FIG. 29B.

In the interpolation mode of the PAL regeneration mode, the frequency of the output clock from the variable frequency clock generation circuit 336 is set to be, e.g., 14.43 MHz so as to cover all the horizontal display area of the PAL monitor in the horizontal direction, and read access of the frame memory 326 is performed. In this interpolation mode, the switch 332 is set at the position of the contact a, and vertical interpolation is performed by the interpolation processing circuit 330, so that the number of scanning lines is increased from about 500 for NTSC to about 600 for PAL. FIG. 30 shows interpolation processing in the interpolation processing circuit 330. FIG. 30 shows one period of processing for forming one-line PAL information from two-line NTSC information in accordance with linear interpolation. This interpolation is repeated in the vertical direction to form data corresponding to about 600 PAL scanning lines from about 500 NTSC scanning lines. In a conventional monitor display, interlaced scanning is performed, so that odd field information is formed and then even field information is formed.

Figure 29B:
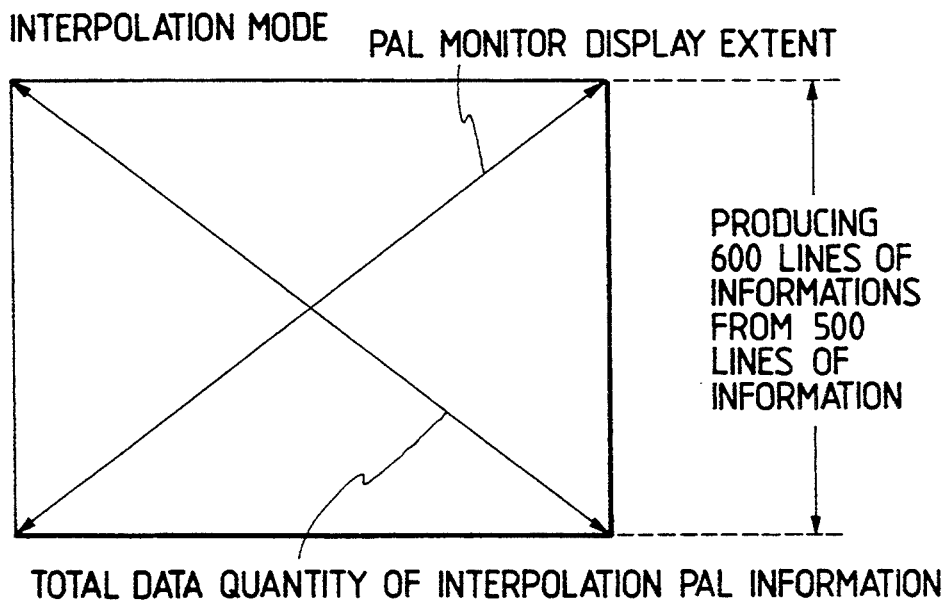

In this manner, the signal interpolated by the interpolation processing circuit 330 is applied to the regeneration processing circuit 334 through the switch 332, and an output from the regeneration processing circuit 334 is applied to the image output processing circuit 340 through the switch 336, the D/A converter 338, and the switch 339. An output from the image output processing circuit 340 is output to a PAL monitor display (not shown). As shown in FIG. 29B, a regenerated image is displayed on the entire screen.

In the above embodiment, an NTSC image is recorded, and the recorded image is selectively regenerated in the NTSC or PAL mode. To the contrary, a PAL image may be recorded, and the recorded image may be selectively regenerated in the NTSC or PAL mode. In this case, as shown in FIG. 28, an image pickup element having the number of pixels corresponding to the number of PAL pixels is used as the image pickup element 318, the frame memory 326 has a storage capacitor capable of storing a PAL image, an output from the PAL oscillator 370 is used in the recording and regeneration mode, and an output from the NTSC oscillator 372 is used in the NTSC regeneration mode.

An operation for recording an image picked up by the image pickup element 318 on the magnetic sheet 348 is the same as described above except for the operation is performed at a PAL frequency, and a detailed description thereof will be omitted. A detailed description of an operation in a PAL regeneration mode output will also be omitted.

Figure 31A:
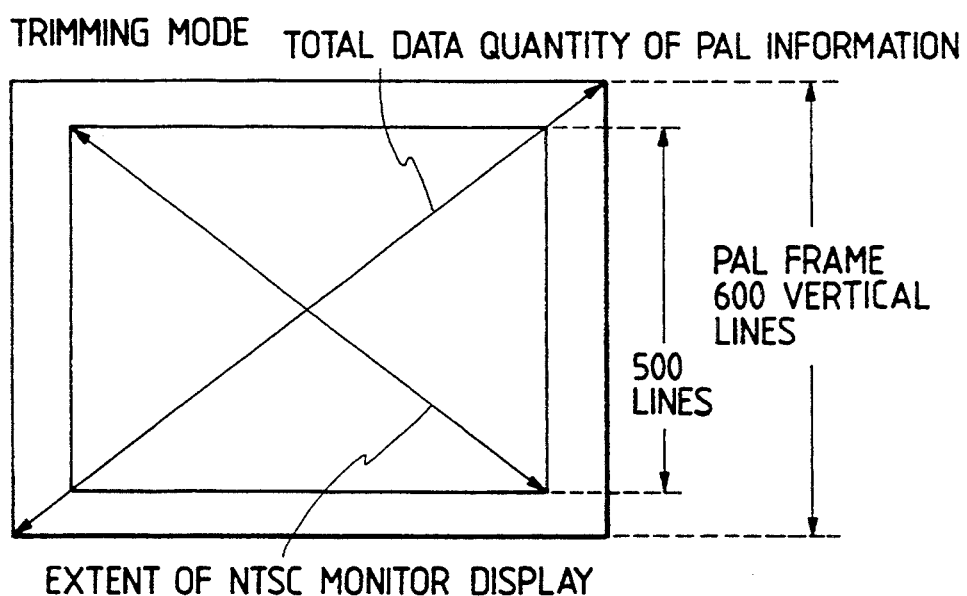
FIGS. 31A and 31B are views showing display modes for regenerating a PAL image in the NTSC mode.

In the regeneration mode of the image recorded on the magnetic sheet 348, a regenerated image from the magnetic sheet 348 is written in the frame memory 326 in synchronism with a PAL synchronizing signal at, e.g., 17.3 MHz. In the NTSC regeneration mode, there are two display modes, i.e., a trimming mode shown in FIG. 31A and an interpolation mode shown in FIG. 31B.

The number of scanning lines on the NTSC monitor display is about 500, while the number of scanning lines on the PAL monitor display is about 600. All PAL scanning line information cannot be displayed on the NTSC monitor display. For this reason, only information of about 500 scanning lines of the central portion of the frame is output. This is the trimming mode shown in FIG. 31A. Only horizontal data satisfying that an aspect ratio is 3:4 is read out from the frame memory 326. For example, the frequency of the read clock applied to the memory 326 of the variable frequency clock generation circuit 366 is set to be 14.43 MHz, and the data of the central position of the frame is displayed on the entire area of the screen of the NTSC monitor. In this mode, the switch 332 is set to the position of the contact b.

A signal read out from the frame memory 326 is applied to the regeneration processing circuit 334 through the switch 332 and is subjected to regeneration processing. An output signal from the regeneration processing circuit 334 is applied to the image output processing circuit 340 through the switch 336, the D/A converter 338, and the switch 339. The image output processing circuit 340 adds a synchronizing signal and the like to the input signal, and the central portion of the regenerated image is displayed on the entire area of the screen of the NTSC monitor display in FIG. 31A.

Figure 31B:
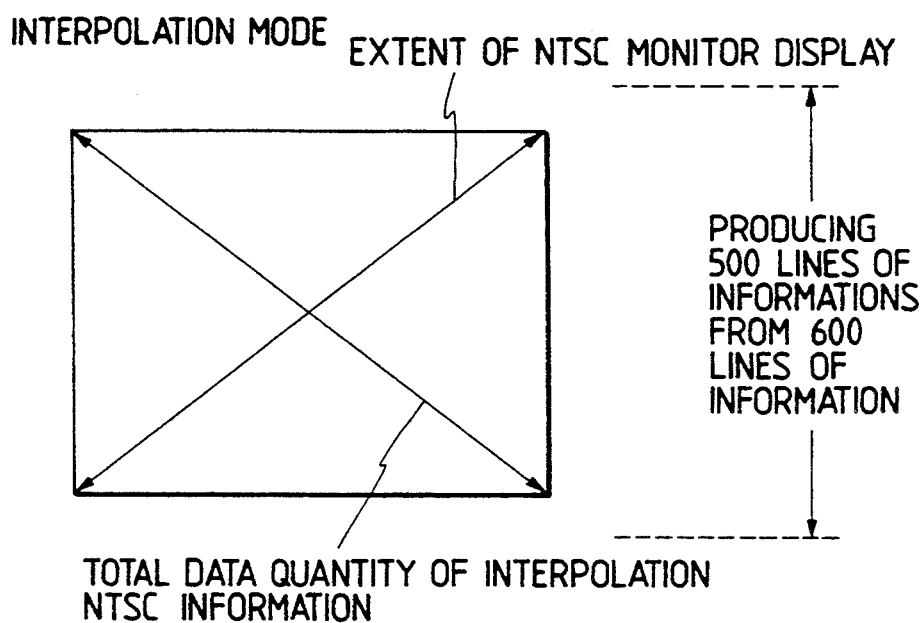
Figure 32:
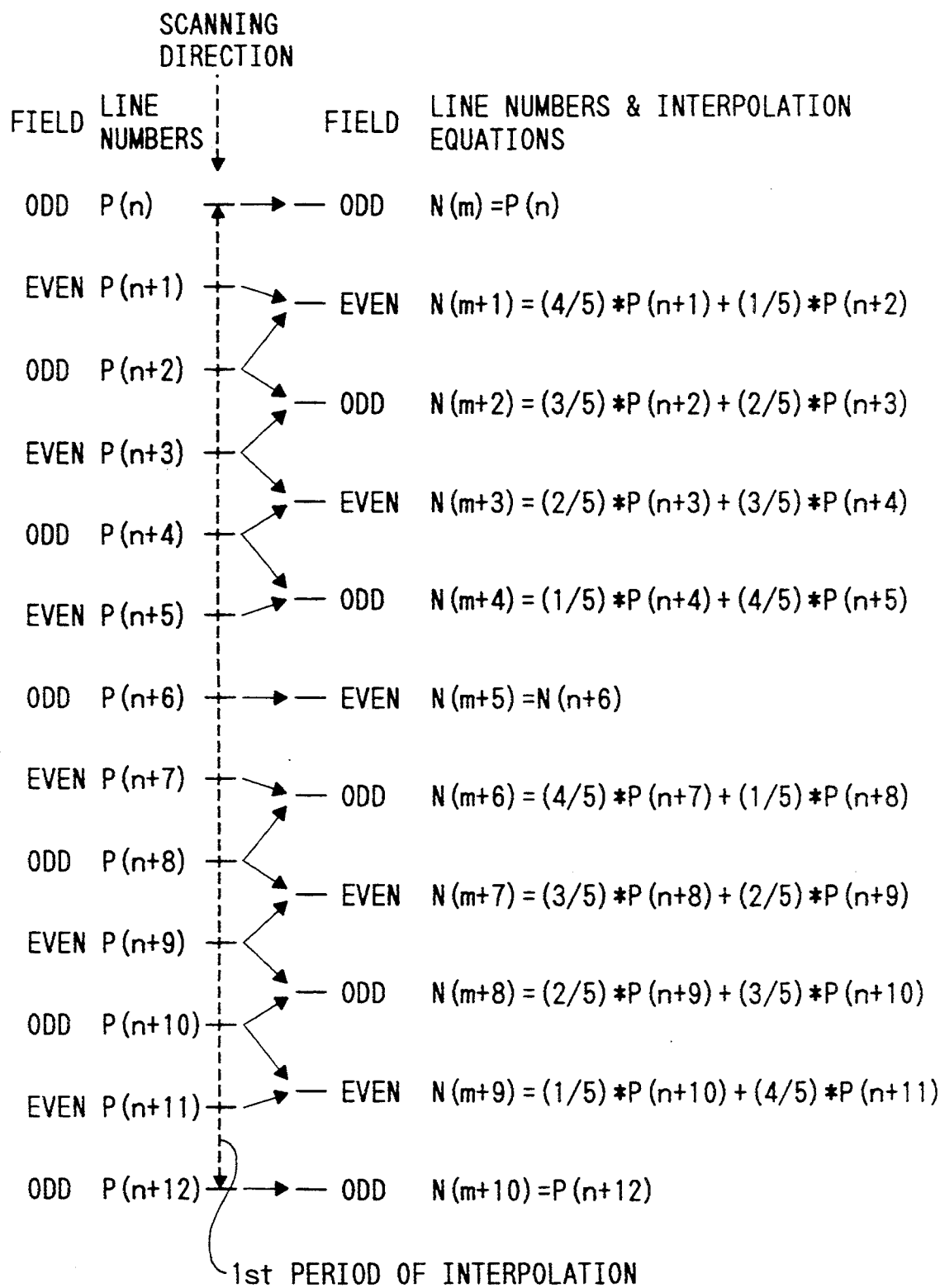
FIG. 32 is a view showing interpolation processing in the case of FIG. 31B.

In the interpolation mode shown in FIG. 31B, the switch 332 is set at the position of the contact a to cause the interpolation processing circuit 330 to generate information of about 500 scanning lines from information of about 600 scanning lines. For example, information of one line is formed from information of two lines in accordance with linear interpolation, as shown in FIG. 32. Image data read out from the frame memory 326 is interpolated by the interpolation processing circuit 330, and the interpolated data is applied to the D/A converter 338 through the switch 332, the regeneration processing circuit 334, and the switch 336. An output from the D/A converter 338 is supplied to the image output processing circuit 340 through the switch 339. An output from the image output processing circuit 340 is displayed on an NTSC monitor display (not shown).

The above embodiment exemplifies a frame image. However, the present invention is also applicable to an image recording/regeneration apparatus for processing a field image. In the field image, the number of vertical scanning lines to be processed is divided into $\frac{1}{2}$, and the same circuit processing as described above can be applied. In addition, recording/regeneration of a still image is exemplified. However, the present invention is also applicable to a motion image. A magnetic tape, an optical disk, or the like may be used as a recording medium As can be easily understood from the above description, according to the present invention, a regenerated image having a television scheme different from that in recording can be obtained. A display mode of the regenerated image can be selectively used in accordance with a desired television scheme, thereby providing a natural display image.

In each of the above embodiments, the PAL and NTSC schemes have been exemplified. The present invention can also be applied to a combination of a high-definition television scheme such as an HD scheme having 1,125 horizontal scanning lines and one of the conventional PAL, NTSC, SECAM schemes.

What is claimed is:

1. An image pickup apparatus comprising:
    a) photoelectric conversion means having a number of effective scanning lines corresponding to a first display system which has a greater number of effective scanning lines than a predetermined number of effective scanning lines of a second display system, said conversion means having a number of effective pixels in one scanning line which number of pixels substantially equals a product of (i) the effective scanning line number corresponding to the first display system and (ii) a ratio between longitudinal and lateral sizes of a frame corresponding to the first display system; and
    b) clock generating means for generating a clock signal the frequency of which corresponds to a value obtained by dividing (i) the product of the effective scanning line number corresponding to the second display system and the ratio between the longitudinal and lateral sizes of the frame corresponding to the second display system, by (ii) an effective scanning period of the one scanning period corresponding to the second display system, thereby outputting an information per pixel from said photoelectric conversion means.

2. An apparatus according to claim 1, wherein said second display system comprises an NTSC system.

3. An apparatus according to claim 1, wherein said first display system comprises a PAL system.

4. An apparatus according to claim 3, wherein said second display system comprises an NTSC system.

5. An apparatus according to claim 1, wherein said first display system comprises a high definition system.

* * * * *

UNITED STATES PATENT AND TRADEMARK OFFICE
CERTIFICATE OF CORRECTION

PATENT NO. : 5,450,129
DATED : September 12, 1995
INVENTOR(S) : KAZUYUKI MATOBA, ET AL.

It is certified that error appears in the above-indentified patent and that said Letters Patent is hereby corrected as shown below: Title page:

Item: <u>[56] RC,</u>
    line FPD, "2156496 6/1990 Japan" should read
    --2-156496 6/1990 Japan--.
<u>Figure 29B,</u>
    "INFORMATIONS" should read --INFORMATION--.
<u>Figure 31B,</u>
    "INFORMATIONS" should read --INFORMATION--.
<u>Column 5,</u>
    line 62, "NTSC/PALmode" should read --NTSC/PAL mode--.
<u>Column 8,</u>
    line 63, "4 fpsc" should read --4fpsc--; and
    line 67, "4 fpsc" should read --4fpsc--.
<u>Column 11,</u>
    line 25, "780. This" should read --780. ¶ This--; and
    line 36, "943. This" should read --943. ¶ This--.
<u>Column 13,</u>
    lines 29, 38 and 51, "&" should read --and--.

UNITED STATES PATENT AND TRADEMARK OFFICE
CERTIFICATE OF CORRECTION

PATENT NO.　:　5,450,129
DATED　　　:　September 12, 1995
INVENTOR(S) :　KAZUYUKI MATOBA, ET AL.

It is certified that error appears in the above-indentified patent and that said Letters Patent is hereby corrected as shown below:

<u>Column 14,</u>
　　　line 31, "y3 to y3." should read --y3 to y4.--.
<u>Column 17,</u>
　　　line 2, "departing" should read --departing from--; and
　　　line 45, "&" should read --and--.
<u>Column 18,</u>
　　　line 53, "to" should read --to be--; and
　　　line 59, "&" should read --and--,
<u>Column 21,</u>
　　　line 42, "FIG. 318," should read --FIG. 31B,--.
<u>Column 22,</u>
　　　line 11, "medium" should read --medium.--.

Signed and Sealed this

Twenty-third Day of January, 1996

Attest:

BRUCE LEHMAN

*Attesting Officer*　　Commissioner of Patents and Trademarks